(12) United States Patent
Tsubata et al.

(10) Patent No.: US 8,023,072 B2
(45) Date of Patent: Sep. 20, 2011

(54) COLOR FILTER SUBSTRATE COMPRISING A LIGHT SHIELDING COLUMN AND DISPLAY DEVICE HAVING THE SAME

(75) Inventors: Toshihide Tsubata, Tsu (JP); Tsuyoshi Tokuda, Tsu (JP); Masayuki Tsuji, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 460 days.

(21) Appl. No.: 11/157,095

(22) Filed: Jun. 20, 2005

(65) Prior Publication Data

US 2006/0017865 A1   Jan. 26, 2006

(30) Foreign Application Priority Data

Jul. 26, 2004   (JP) ................................ 2004-217679

(51) Int. Cl.
*G02F 1/1335* (2006.01)
*G02F 1/1333* (2006.01)

(52) U.S. Cl. ........ 349/106; 349/107; 349/108; 349/109; 349/110

(58) Field of Classification Search ........... 349/106–111
See application file for complete search history.

(56) References Cited

U.S. PATENT DOCUMENTS

| | | | | |
|---|---|---|---|---|
| 5,128,786 A | * | 7/1992 | Yanagisawa | 349/111 |
| 6,100,953 A | * | 8/2000 | Kim et al. | 349/129 |
| 6,215,538 B1 | * | 4/2001 | Narutaki et al. | 349/106 |
| 6,661,488 B1 | | 12/2003 | Takeda et al. | |
| 6,771,344 B2 | | 8/2004 | Lyu et al. | |
| 6,791,647 B1 | * | 9/2004 | Kim et al. | 349/129 |
| 7,136,135 B2 | * | 11/2006 | Sawasaki | 349/156 |
| 7,184,118 B2 | * | 2/2007 | Lee et al. | 349/156 |
| 2001/0052889 A1 | * | 12/2001 | Fukunishi | 345/87 |
| 2002/0060764 A1 | * | 5/2002 | Taniguchi et al. | 349/130 |
| 2002/0093617 A1 | * | 7/2002 | Matsuyama et al. | 349/156 |

FOREIGN PATENT DOCUMENTS

| | | |
|---|---|---|
| JP | 63-179323 | 7/1988 |
| JP | 08-20627 | 1/1996 |
| JP | 10-333170 | 12/1998 |
| JP | 11-174477 | 7/1999 |
| JP | 11-242225 | 9/1999 |
| JP | 2000-329924 A | 11/2000 |
| JP | 2002-107740 | 4/2002 |

* cited by examiner

*Primary Examiner* — Mark Robinson
*Assistant Examiner* — Charles Chang
(74) *Attorney, Agent, or Firm* — Keating & Bennett, LLP

(57) ABSTRACT

A color filter substrate is used in a display device including pixels arranged in columns and rows to define a matrix pattern. The color filter substrate includes a transparent substrate and coloring layers, including a first color filter layer, a second color filter layer and an light shielding layer, provided on the transparent substrate. The first and second color filter layers include a first color filter column and a second color filter column, respectively, each of which is arranged for an associated column of pixels. The light shielding layer includes an light shielding column, which is provided for a gap between two adjacent columns of pixels. In a gap between two pixels that are adjacent in a row direction, an intercolumnar overlap area, in which the light shielding column and at least one of the first and second color filter columns overlap each other, and an intercolumnar non-overlap area, in which the light shielding column is overlapped by neither the first nor the second color filter column, are defined, and the intercolumnar non-overlap area is defined so as to extend continuously in the row direction through the gap between the two adjacent pixels.

24 Claims, 24 Drawing Sheets

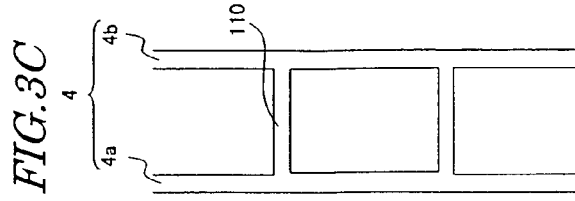
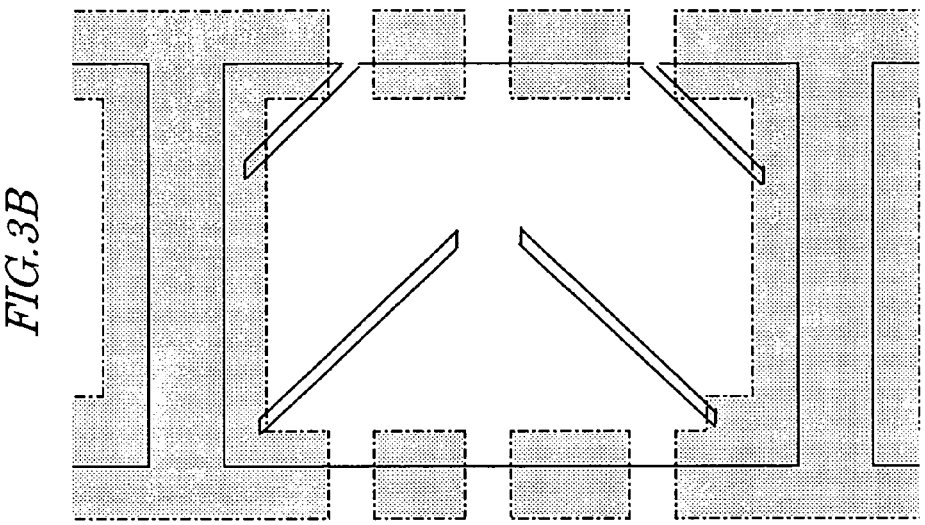
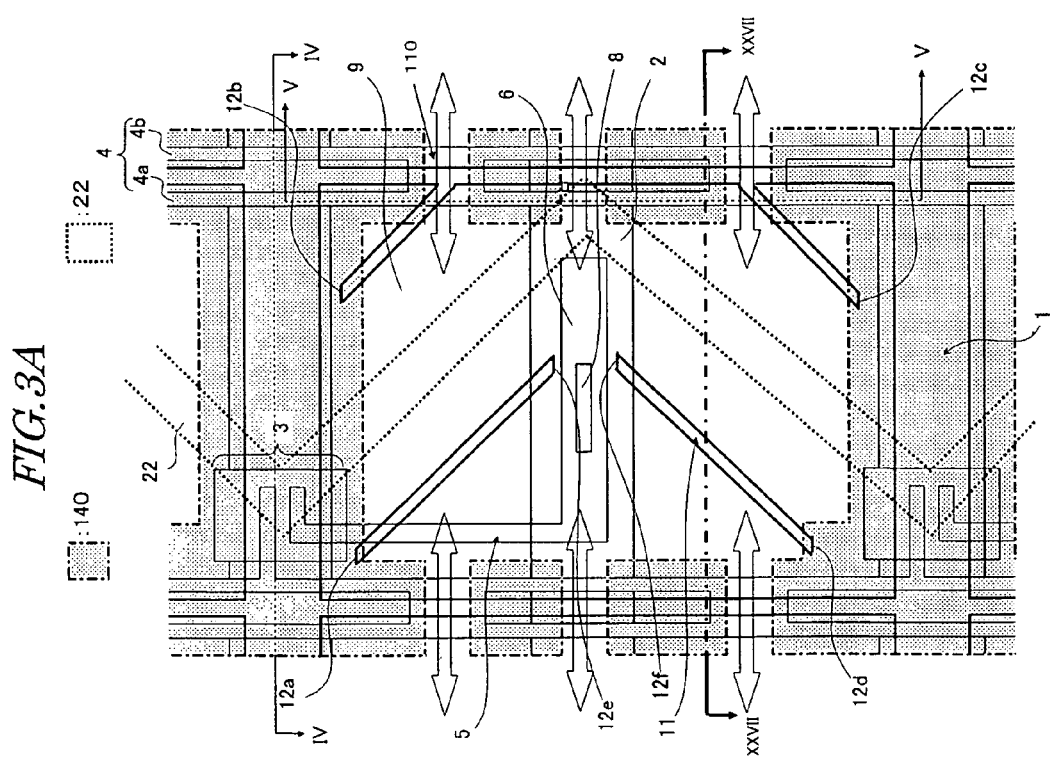

FIG.6
(a)
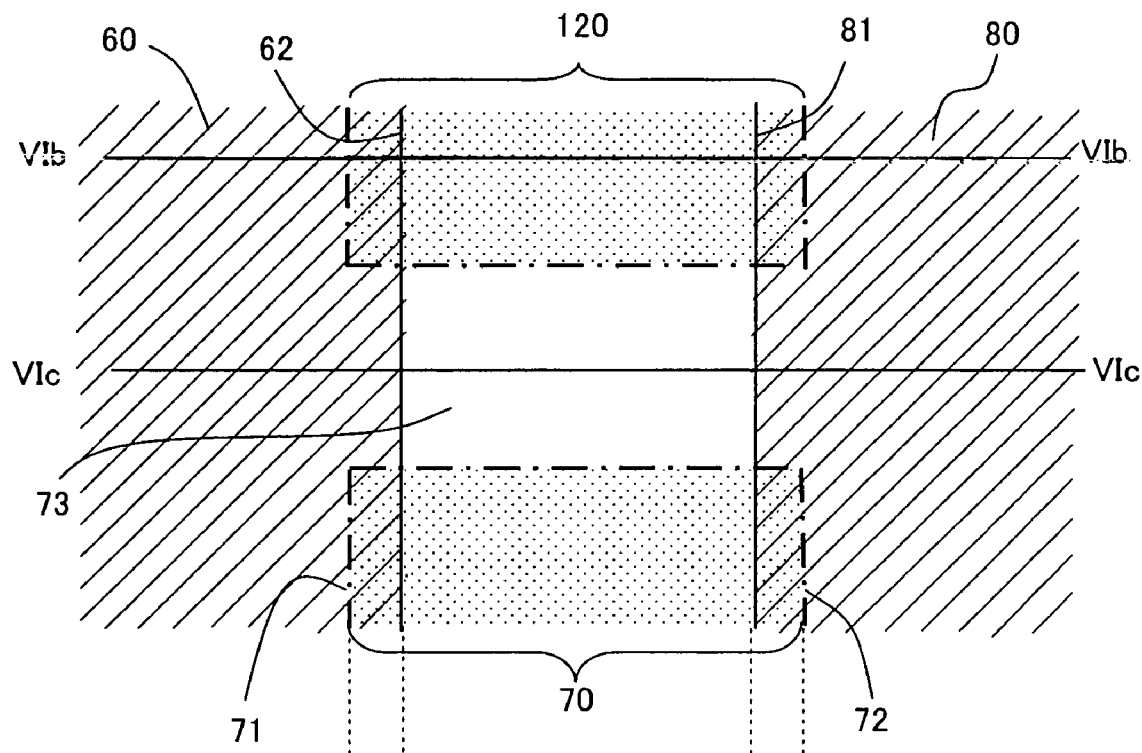
(b)
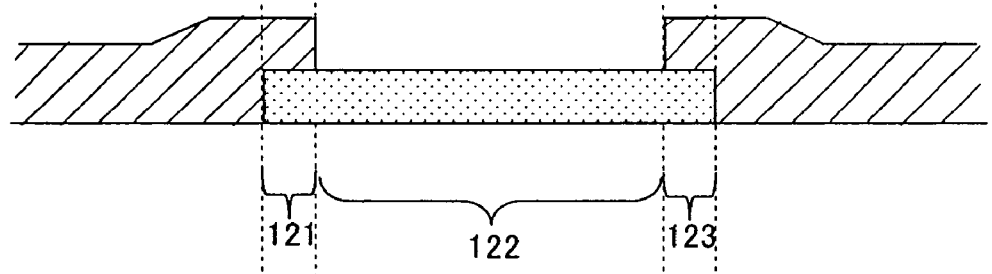
(c)
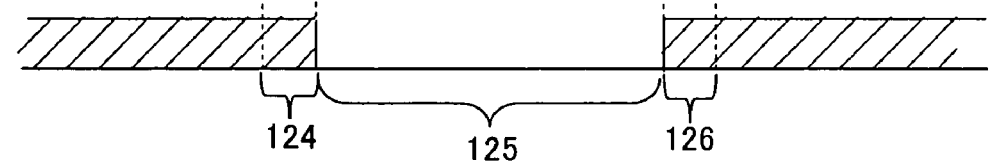

FIG.10A
(a)
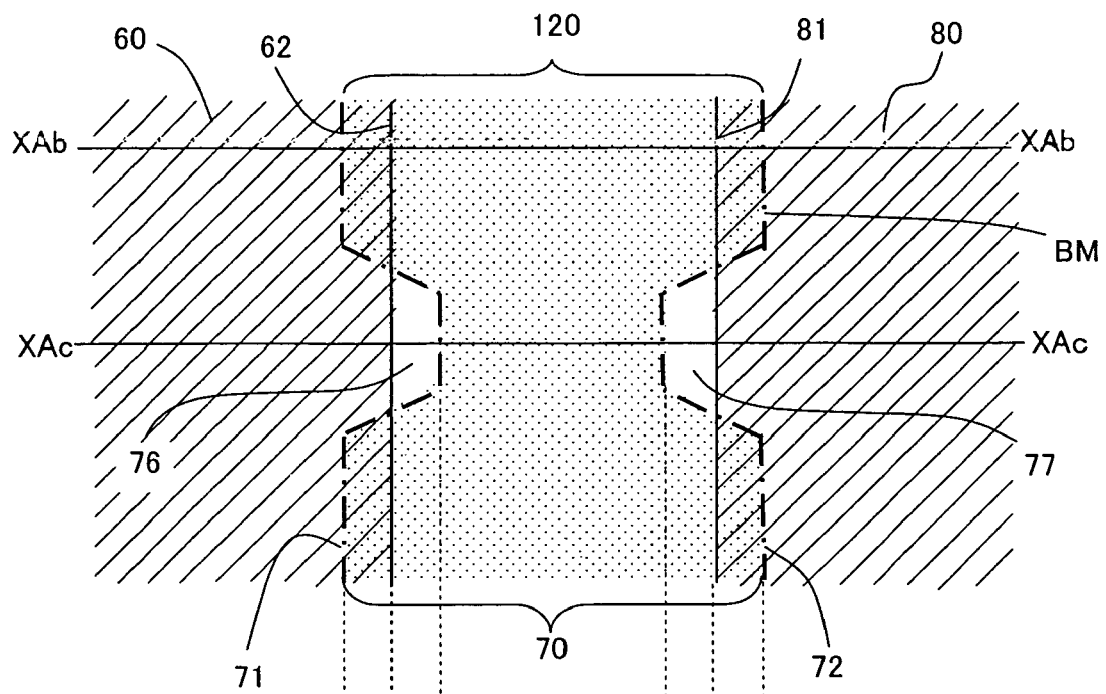
(b)
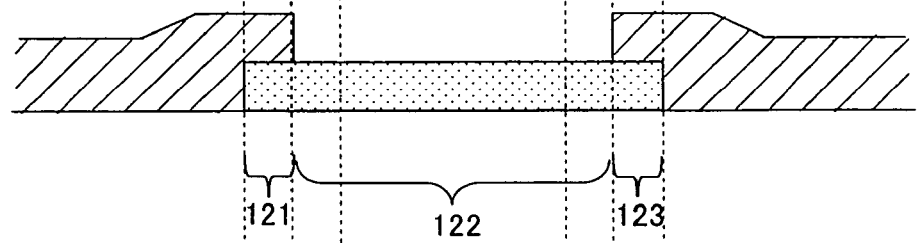
(c)
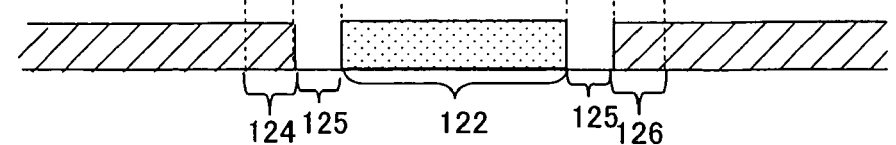

FIG.10C
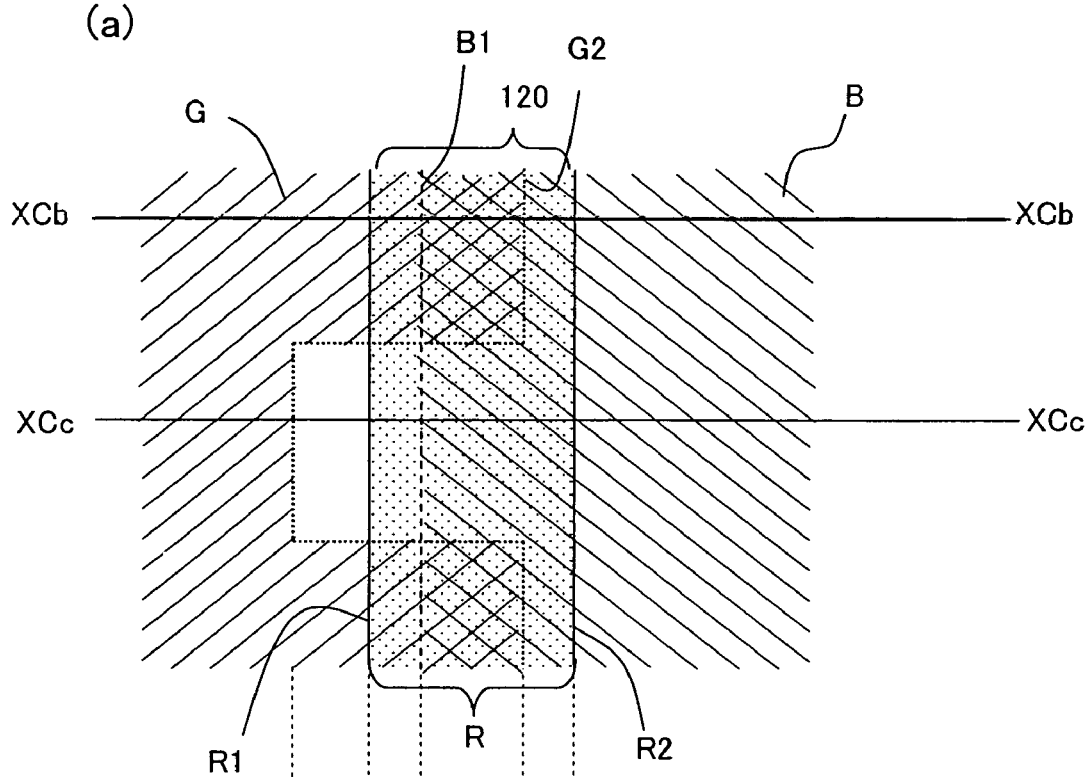
(a)
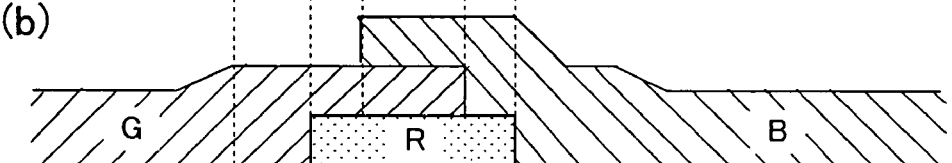
(b)
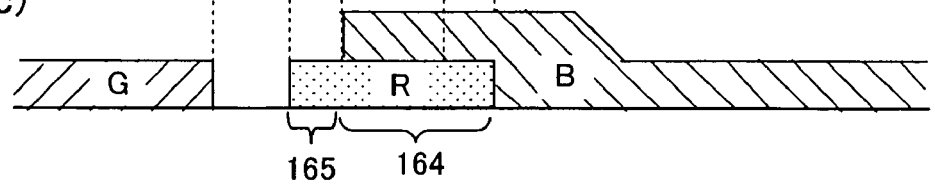
(c)

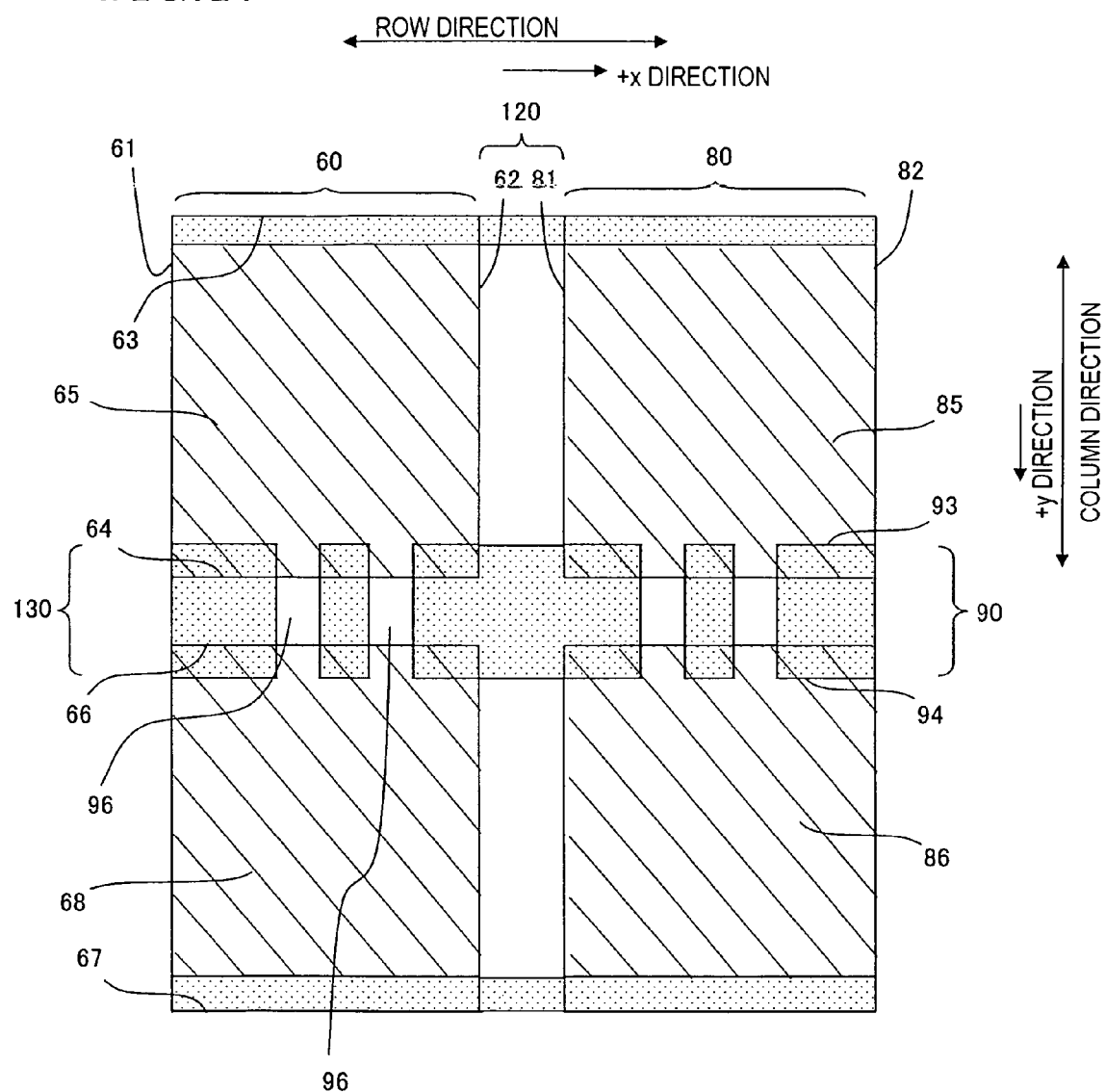

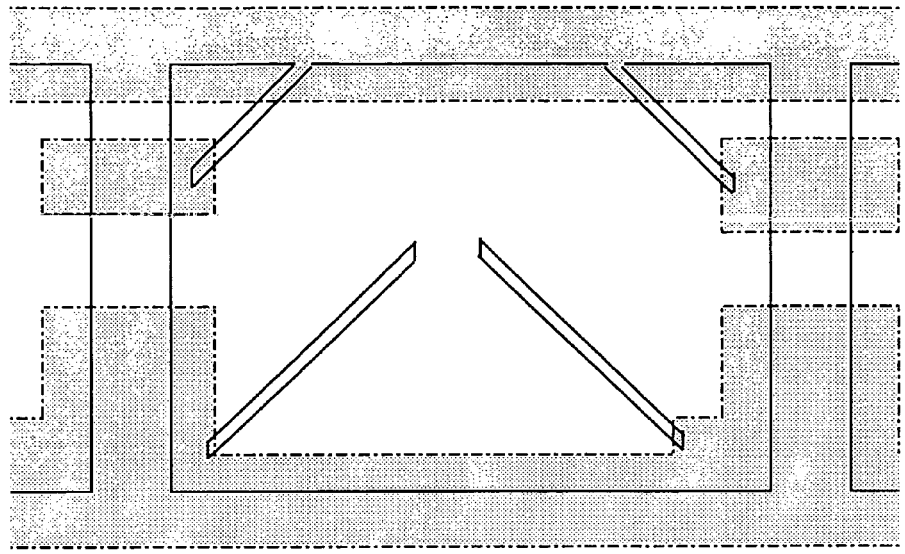
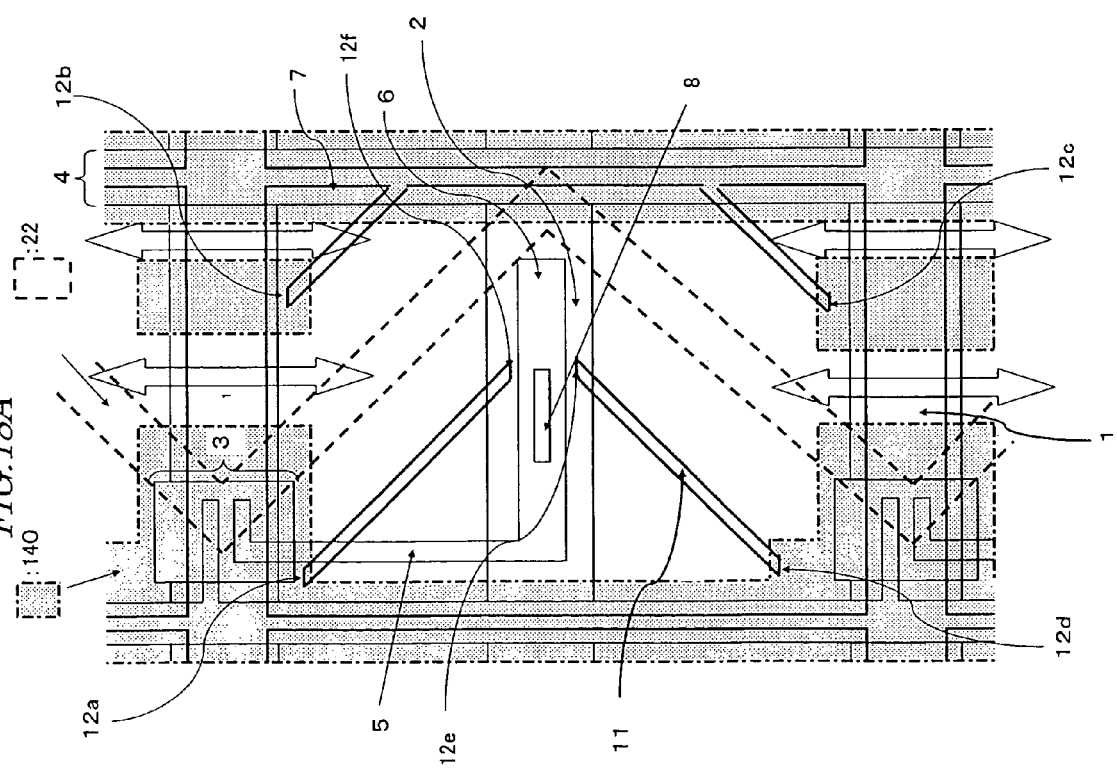

FIG.19
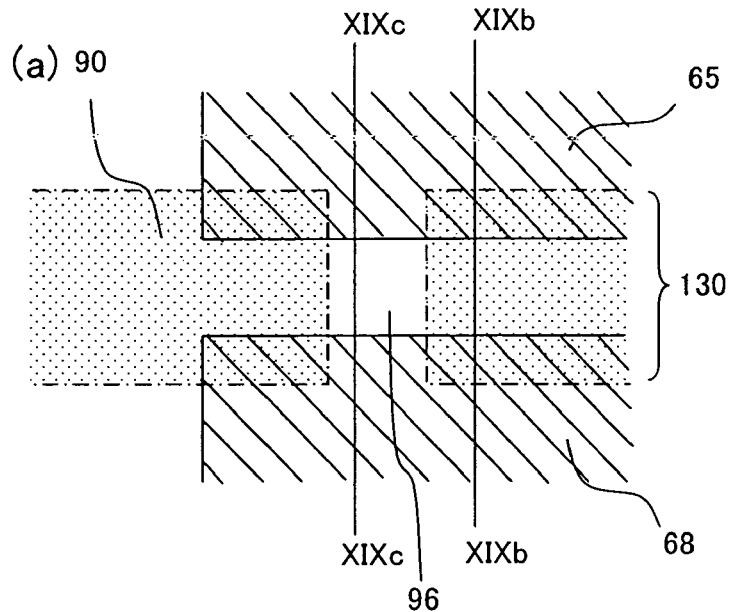
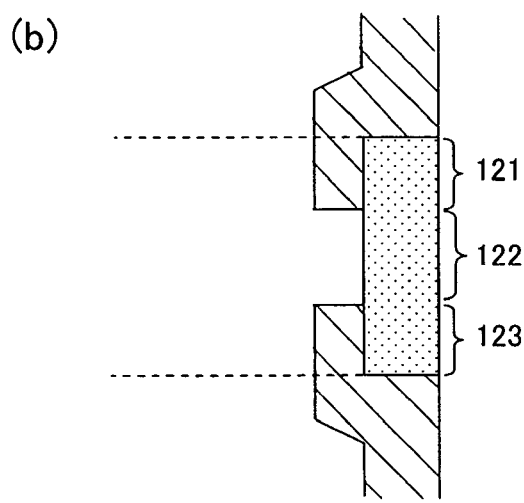
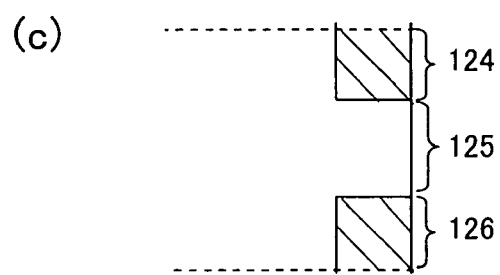

COLOR FILTER SUBSTRATE COMPRISING A LIGHT SHIELDING COLUMN AND DISPLAY DEVICE HAVING THE SAME

BACKGROUND OF THE INVENTION

1. Field of the Invention

The present invention relates to a color filter substrate for use in a color liquid crystal display (LCD) and other display devices.

2. Description of the Related Art

LCDs are relatively small, thin and lightweight display devices with comparatively low power dissipation. By taking advantage of these features, LCDs are currently used extensively in a broad variety of electronic appliances. Among other things, active-matrix-addressed LCDs with switching elements are used particularly widely in office automation (OA) equipment including personal computers, audiovisual (AV) appliances such as TV sets, and cell phones. Meanwhile, the size, definition, effective pixel area ratio (i.e., aperture ratio), viewing angle, color purity and other quality parameters of LCDs have recently been increased or improved by leaps and bounds.

An LCD for a big size TV monitor, in particular, is recently required to increase its response speed and improve its viewing angle characteristic (or widen its viewing angle range) more than anything else. However, the conventional twisted nematic (TN) or super twisted nematic (STN) mode LCDs have just narrow viewing angle ranges, which is a problem. Thus, to overcome this problem, various technologies have been developed so far.

A multi-domain vertical alignment (MVA) mode LCD is a typical product of those new technologies (see Japanese Patent Application Laid-Open Publication No. 11-242225, for example). The MVA mode LCD includes a protrusion for controlling the pretilt angles of liquid crystal molecules (i.e., controlling the orientations thereof) on the surface of a substrate and an electrode with a slit or any other form of opening. The protrusion and the slit contribute to grouping the orientations of the liquid crystal molecules, thus improving the viewing angle characteristic and increasing the response speed of the liquid crystal molecules. For example, Example 5 of Japanese Patent Application Laid-Open Publication No. 11-242225 discloses an MVA mode LCD in which multiple columns of protrusions are provided for a counter electrode on a color filter substrate and a plurality of slits are cut through pixel electrodes on an active-matrix substrate opposed to the color filter substrate. Japanese Patent Application Laid-Open Publication No. 11-242225 also discloses an arrangement in which both the pixel electrodes and the counter electrode have slits and an arrangement in which both the pixel electrodes and the counter electrode have protrusions.

Meanwhile, to fabricate an LCD panel, a liquid crystal material needs to be injected into the gap between an active-matrix substrate and a color filter substrate facing each other. More specifically, a seal resin is applied onto the inside edges of the active-matrix substrate and the color filter substrate, thereby forming sealing portions. Next, the sealing portions of these substrates are bonded together such that a predetermined gap is left between the two substrates. Thereafter, a liquid crystal material is injected into this gap and then the resultant liquid crystal cell is sealed up. A vacuum injection process has often been used in the prior art as a method for injecting the liquid crystal material. In the vacuum injection process, first, the liquid crystal cell is loaded into a vacuum chamber, thereby evacuating the liquid crystal cell and creating and holding a vacuum in the cell. Next, an injection port, provided in the sealing portions, is put into a liquid crystal material stored in a container. Thereafter, the pressure in the chamber is raised back to the ordinary pressure again, thereby making the liquid crystal material permeate the liquid crystal cell at the atmospheric pressure. Then, the injection port is sealed with a resin. However, according to this vacuum injection process, it takes a lot of time to finish injecting the liquid crystal material. This problem gets even more serious when this process is applied to making a big LCD panel for a big-screen TV.

Thus, to avoid this problem, the injection process has recently been replaced by a dropping process more and more often (see Japanese Patent Gazette for Opposition No. 8-20627, for example). In the dropping process, a sealing portion is provided on the surface of one of two substrates facing each other, a liquid crystal material is dropped onto the area inside the sealing portion, and then the substrate with this sealing portion and the other substrate are bonded together and the sealing portion is cured. According to this dropping process, a liquid crystal cell can be obtained while the liquid crystal material injected is being encapsulated.

In the dropping process, however, it is difficult to constantly drop the same amount of liquid crystal material onto the sealing portion per unit time at a controlled rate. That is why some bubbles may remain in the liquid crystal cell due to the inconstant dropping rate. Those bubbles will be referred to herein as "residual bubbles". The techniques of eliminating those residual bubbles from the dropping process are disclosed by Japanese Patent Application Laid-Open Publications No. 2002-107740 and No. 11-174477, for example. Specifically, Japanese Patent Application Laid-Open Publication No. 2002-107740 discloses a method for preventing residual bubbles from being produced due to the lack of the liquid crystal material injected by collecting the liquid crystal material once dropped if the amount of the liquid crystal material dropped has deviated from a reference value. On the other hand, Japanese Patent Application Laid-Open Publication No. 11-174477 discloses a method for preventing residual bubbles from being produced due to the emission of gases (e.g., adsorbed water) from color filters in an LCD with a color filter substrate by thermally treating and degassing the color filter substrate and then dropping a liquid crystal material.

Those residual bubbles produced by the dropping process are very noticeable in an MVA mode LCD, in particular. For example, suppose a pixel electrode has a plurality of slits as disclosed in Japanese Patent Application Laid-Open Publication No. 11-242225. In that case, liquid crystal molecules with various different orientations are present around the shorter side of each slit 11 (i.e., the side intersecting with the longer sides thereof) as identified by the reference numerals 12a, 12b, 12c, 12d, 12e and 12f in FIG. 7B. Thus, the liquid crystal molecules have disturbed, abnormal orientations. As a result, not just the viewing angle characteristic deteriorates but also the luminance and response speed of the panel decrease as well. Furthermore, when black display is switched into white display, the white presented on the screen instantaneously becomes brighter than the intended one to produce an after image, too. It should be noted that electrode portions near the shorter sides (i.e., ends) of the slit connect together parts of an electrode that are divided by the slit, and will be referred to herein as "electrically connecting portions" after Japanese Patent Application Laid-Open Publication No. 11-242225.

Thus, in Example 6 of Japanese Patent Application Laid-Open Publication No. 11-242225, multiple columns of protrusions are arranged in a zigzag pattern on the counter electrode on the color filter substrate, while a plurality of slits are arranged in the same zigzag pattern on the pixel electrodes on the active-matrix substrate. In such an arrangement, a black matrix (BM) 140 having openings with a closed cross section is provided as shown in FIG. 7B in order to cover those portions with the abnormal orientations. Japanese Patent Application Laid-Open Publication No. 11-242225 also discloses that the electrically connecting portions 12e and 12f are shielded from light with a storage capacitor electrode, which is provided for the active-matrix substrate to stabilize the potential at the pixel electrodes.

However, if a LCD panel is fabricated by the dropping process using such a BM, then the BM constitutes a barrier, which prevents the liquid crystal material dropped from being distributed sufficiently broadly, thus slowing down the progress of the liquid crystal material and producing bubbles eventually.

A similar problem is observed in any liquid crystal display device including a BM having openings with such a closed cross section, no matter whether the LCD operates in the MVA mode or in the TN mode. Particularly, if the thickness of the liquid crystal layer is reduced to increase the response speed, then the progress of the liquid crystal material will be even slower and the bubbles will be produced even more easily. Also, comparing the MVA mode LCD and the TN mode LCD to each other, the bubbles produced are more noticeable in the MVA mode LCD than in the TN mode LCD. This is because the liquid crystal material used for the MVA mode LCD has higher viscosity than that used for the TN mode LCD. Thus, the liquid crystal material has higher flow resistance around the surface of the alignment film. In addition, the MVA mode LCD has protrusions for controlling the orientations of liquid crystal molecules.

It should be noted that neither the technique disclosed in Japanese Patent Application Laid-Open Publication No. 2002-107740 nor that disclosed in Japanese Patent Application Laid-Open Publication No. 11-174477 was developed to prevent those residual bubbles from being produced by a BM with such openings. Thus, it is difficult to overcome those problems by any of these techniques.

In order to overcome the problems described above, preferred embodiments of the present invention provide a color filter substrate that can eliminate those residual bubbles, which would otherwise be produced when an LCD panel is made by a dropping process, and a display device including such a color filter substrate.

SUMMARY OF THE INVENTION

A color filter substrate according to a preferred embodiment of the present invention is preferably used in a display device including a plurality of pixels, which are arranged in columns and rows to define a matrix pattern. The color filter substrate preferably includes a transparent substrate and a number of coloring layers, including a first color filter layer, a second color filter layer and an light shielding layer, which are provided on the transparent substrate. The first and second color filter layers preferably include a first color filter column and a second color filter column, respectively, each of which is arranged for an associated column of pixels. The light shielding layer preferably includes an light shielding column, which is provided for a gap between two adjacent columns of pixels. In a gap between two pixels that are adjacent in a row direction, an intercolumnar overlap area, in which the light shielding column and at least one of the first and second color filter columns overlap each other, and an intercolumnar non-overlap area, in which the light shielding column is overlapped by neither the first color filter column nor the second color filter column, are preferably defined, and the intercolumnar non-overlap area is preferably defined so as to extend continuously in the row direction through the gap between the two adjacent pixels.

As used herein, the "intercolumnar overlap area in which the light shielding column and at least one of the first and second color filter columns overlap each other" includes an area in which the light shielding column and the first color filter column overlap each other and an area in which the light shielding column and the second color filter column overlap each other. However, the "intercolumnar overlap area" does not always refer to such an area where the light shielding column and one of the first and second color filter columns overlap each other but also includes an area where the light shielding column and both of the first and second color filter columns overlap each other (i.e., an overlap area consisting of three layers).

In one preferred embodiment of the present invention, the light shielding column preferably includes at least one recess in the intercolumnar non-overlap area.

In this particular preferred embodiment, each of the first color filter column, the light shielding column and the second color filter column preferably has a first side and a second side, which define its width in the row direction. If a direction, which is pointed from the first side of the first color filter column, the light shielding column or the second color filter column toward the second side thereof and parallel to the row direction, is called +x direction, the first color filter column, the light shielding column and the second color filter column are preferably arranged in this order in the +x direction. The first side of the light shielding column preferably has at least one first-side recess, which recedes from the first side of the light shielding column toward the second side thereof in the row direction, in the intercolumnar non-overlap area. The second side of the light shielding column preferably has at least one second-side recess, which recedes from the second side of the light shielding column toward the first side thereof in the row direction, in the intercolumnar non-overlap area.

In one preferred embodiment, the first-side recess of the light shielding column is preferably opposed to the second-side recess thereof.

In a specific preferred embodiment, the first-side and second-side recesses of the light shielding column are preferably joined together.

In another preferred embodiment, each of the first and second color filter columns preferably has at least one recess in the intercolumnar non-overlap area.

In this particular preferred embodiment, each of the first color filter column, the light shielding column and the second color filter column preferably has a first side and a second side, which define its width in the row direction. If a direction, which is pointed from the first side of the first color filter column, the light shielding column or the second color filter column toward the second side thereof and parallel to the row direction, is called +x direction, the first color filter column, the light shielding column and the second color filter column are preferably arranged in this order in the +x direction. The first side of the second color filter column preferably has at least one first-side recess, which recedes from the first side of the second color filter column toward the second side thereof in the row direction, in the intercolumnar non-overlap area. The second side of the first color filter column preferably has at least one second-side recess, which recedes from the second side of the first color filter column toward the first side thereof in the row direction, in the intercolumnar non-overlap area.

In a specific preferred embodiment, the first-side recess of the second color filter column is preferably provided so as to face the second-side recess of the first color filter column with the light shielding column interposed between the first and second color filter columns.

In another preferred embodiment, each of the light shielding column and the first and second color filter columns preferably has at least one recess in the intercolumnar non-overlap area.

In this particular preferred embodiment, each of the first color filter column, the light shielding column and the second color filter column preferably has a first side and a second side, which define its width in the row direction. If a direction, which is pointed from the first side of the first color filter column, the light shielding column or the second color filter column toward the second side thereof and parallel to the row direction, is called +x direction, the first color filter column, the light shielding column and the second color filter column are preferably arranged in this order in the +x direction. The first side of the light shielding column preferably has at least one first-side recess, which recedes from the first side of the light shielding column toward the second side thereof in the row direction, in the intercolumnar non-overlap area. The second side of the light shielding column preferably has at least one second-side recess, which recedes from the second side of the light shielding column toward the first side thereof in the row direction, in the intercolumnar non-overlap area. The first side of the second color filter column preferably has at least one first-side recess, which recedes from the first side of the second color filter column toward the second side thereof in the row direction, in the intercolumnar non-overlap area. The second side of the first color filter column preferably has at least one second-side recess, which recedes from the second side of the first color filter column toward the first side thereof in the row direction, in the intercolumnar non-overlap area.

In one preferred embodiment, the first-side recess of the light shielding column is preferably opposed to the second-side recess thereof.

In a specific preferred embodiment, the first-side and second-side recesses of the light shielding column are preferably joined together.

In another preferred embodiment, the second-side recess of the first color filter column is preferably opposed to the first-side recess of the second color filter column.

More specifically, the first-side recess of the second color filter column and the second-side recess of the first color filter column are preferably joined together by way of the first-side and second-side recesses of the light shielding column.

In yet another preferred embodiment, the intercolumnar non-overlap area is preferably arranged so as to face a data signal line on an active-matrix substrate, which is opposed to the color filter substrate with a display medium layer interposed between the two substrates.

In a specific preferred embodiment, the data signal line preferably includes a plurality of branches and a conductive portion that connects the branches together, and the intercolumnar non-overlap area is preferably provided so as to face the conductive portion.

In yet another preferred embodiment, the intercolumnar non-overlap area is preferably arranged so as to face a storage capacitor line on an active-matrix substrate.

A color filter substrate according to another preferred embodiment of the present invention is preferably used in a display device including a plurality of pixels, which are arranged in columns and rows to define a matrix pattern. The color filter substrate preferably includes a transparent substrate and a number of coloring layers, including a first color filter layer, a second color filter layer and an light shielding layer, which are provided on the transparent substrate. The first and second color filter layers preferably include a first color filter column and a second color filter column, respectively, each of which is arranged for an associated column of pixels. The light shielding layer preferably includes an light shielding row, which is provided for a gap between two adjacent rows of pixels. In a gap between two pixels that are adjacent in a column direction, an interrow overlap area, in which the light shielding row and at least one of the first and second color filter columns overlap each other, and an interrow non-overlap area, in which the light shielding row is overlapped by neither the first color filter column nor the second color filter column, are preferably defined, and the interrow non-overlap area is preferably defined so as to extend continuously in the column direction through the gap between the two adjacent pixels.

As used herein, the "interrow overlap area in which the light shielding row and at least one of the first and second color filter columns overlap each other" includes an area in which the light shielding row and the first color filter column overlap each other and an area in which the light shielding row and the second color filter column overlap each other. However, the "interrow overlap area" does not always refer to such an area where the light shielding row and one of the first and second color filter columns overlap each other but also includes an area where the light shielding row and both of the first and second color filter columns overlap each other (i.e., an overlap area consisting of three layers).

In one preferred embodiment of the present invention, the light shielding row preferably includes at least one recess in the interrow non-overlap area.

In this particular preferred embodiment, each of the light shielding row, the first color filter column and the second color filter column preferably has a first side and a second side, which define its width in the row direction. If a direction, which is pointed from the first side of the first color filter column, the light shielding row or the second color filter column toward the second side thereof and parallel to the row direction, is called +x direction, the first color filter column, the light shielding row and the second color filter column are preferably arranged in this order in the +x direction. Each of the first and second color filter columns preferably includes multiple color filter portions, which are arranged for respective pixels and which include a first color filter portion and a second color filter portion that are separated from each other by a gap between two pixels adjacent in a column direction. Each of the first color filter portion, the light shielding row and the second color filter portion preferably has a third side and a fourth side, which define its width in the column direction. If a direction, which is pointed from the third side of the first color filter portion, the light shielding row or the second color filter portion toward the fourth side thereof and parallel to the column direction, is called +y direction, the first color filter portion, the light shielding row and the second color filter portion are preferably arranged in this order in the +y direction. The third side of the light shielding row preferably has at least one third-side recess, which recedes from the third side of the light shielding row toward the fourth side thereof in the column direction, in the interrow non-overlap area. The fourth side of the light shielding row preferably has at least one fourth-side recess, which recedes from the fourth side of the light shielding row toward the third side thereof in the column direction, in the interrow non-overlap area.

In one preferred embodiment, the third-side recess of the light shielding row is preferably opposed to the fourth-side recess thereof.

In another preferred embodiment, the third-side and fourth-side recesses of the light shielding row are preferably joined together.

In yet another preferred embodiment, each of the first and second color filter columns preferably has at least one recess in the interrow non-overlap area.

In yet another preferred embodiment, each of the light shielding row, the first color filter column and the second color filter column preferably has a first side and a second side, which define its width in the row direction. If a direction, which is pointed from the first side of the first color filter column, the light shielding row or the second color filter column toward the second side thereof and parallel to the row direction, is called +x direction, the first color filter column, the light shielding row and the second color filter column are preferably arranged in this order in the +x direction. Each of the first and second color filter columns preferably includes multiple color filter portions, which are arranged for respective pixels and which include a first color filter portion and a second color filter portion that are separated from each other by a gap between two pixels adjacent in a column direction. Each of the first color filter portion, the light shielding row and the second color filter portion preferably has a third side and a fourth side, which define its width in the column direction. If a direction, which is pointed from the third side of the first color filter portion, the light shielding row or the second color filter portion toward the fourth side thereof and parallel to the column direction, is called +y direction, the first color filter portion, the light shielding row and the second color filter portion are preferably arranged in this order in the +y direction. The third side of the second color filter portion preferably has at least one third-side recess, which recedes from the third side of the second color filter portion toward the fourth side thereof in the column direction, in the interrow non-overlap area. The fourth side of the first color filter portion preferably has at least one fourth-side recess, which recedes from the fourth side of the first color filter portion toward the third side thereof in the column direction, in the interrow non-overlap area.

In a specific preferred embodiment, the third-side recess of the second color filter portion is preferably opposed to the fourth-side recess of the first color filter portion by way of the light shielding row.

In yet another preferred embodiment, each of the light shielding row and the first and second color filter columns preferably has at least one recess in the interrow non-overlap area.

In yet another preferred embodiment, each of the light shielding row, the first color filter column and the second color filter column preferably has a first side and a second side, which define its width in the row direction. If a direction, which is pointed from the first side of the first color filter column, the light shielding row or the second color filter column toward the second side thereof and parallel to the row direction, is called +x direction, the first color filter column, the light shielding row and the second color filter column are preferably arranged in this order in the +x direction. Each of the first and second color filter columns preferably includes multiple color filter portions, which are arranged for respective pixels and which include a first color filter portion and a second color filter portion that are separated from each other by a gap between two pixels adjacent in a column direction. Each of the first color filter portion, the light shielding row and the second color filter portion preferably has a third side and a fourth side, which define its width in the column direction. If a direction, which is pointed from the third side of the first color filter portion, the light shielding row or the second color filter portion toward the fourth side thereof and parallel to the column direction, is called +y direction, the first color filter portion, the light shielding row and the second color filter portion are preferably arranged in this order in the +y direction. The third side of the light shielding row preferably has at least one third-side recess, which recedes from the third side of the light shielding row toward the fourth side thereof in the column direction, in the interrow non-overlap area. The fourth side of the light shielding row preferably has at least one fourth-side recess, which recedes from the fourth side of the light shielding row toward the third side thereof in the column direction, in the interrow non-overlap area. The third side of the second color filter portion preferably has at least one third-side recess, which recedes from the third side of the second color filter portion toward the fourth side thereof in the column direction, in the interrow non-overlap area. The fourth side of the first color filter portion preferably has at least one fourth-side recess, which recedes from the fourth side of the first color filter portion toward the third side thereof in the column direction, in the interrow non-overlap area.

In one preferred embodiment, the third-side recess of the light shielding row is preferably opposed to the fourth-side recess thereof.

In another preferred embodiment, the third-side and fourth-side recesses of the light shielding row are preferably joined together.

In a specific preferred embodiment, the third-side recess of the second color filter portion is preferably opposed to the fourth-side recess of the first color filter portion by way of the light shielding row.

In yet another preferred embodiment, the third-side recess of the second color filter portion and the fourth-side recess of the first color filter portion are preferably joined together by way of the third-side and fourth-side recesses of the light shielding row.

In yet another preferred embodiment, the interrow non-overlap area is preferably arranged so as to face a scan signal line on an active-matrix substrate, which is opposed to the color filter substrate with a display medium layer interposed between the two substrates.

In yet another preferred embodiment, in a gap between two pixels that are adjacent in a row direction, an intercolumnar overlap area, in which the light shielding column and at least one of the first and second color filter columns overlap each other, and an intercolumnar non-overlap area, in which the light shielding column is overlapped by neither the first color filter column nor the second color filter column, are preferably defined, and the intercolumnar non-overlap area is preferably defined so as to extend continuously in the row direction through the gap between the two adjacent pixels.

In yet another preferred embodiment, the light shielding column preferably includes at least one recess in the intercolumnar non-overlap area.

In yet another preferred embodiment, the first side of the light shielding column preferably has at least one first-side recess, which recedes from the first side of the light shielding column toward the second side thereof in the row direction, in the intercolumnar non-overlap area. The second side of the light shielding column preferably has at least one second-side recess, which recedes from the second side of the light shielding column toward the first side thereof in the row direction, in the intercolumnar non-overlap area.

In one preferred embodiment, the first-side recess of the light shielding column is preferably opposed to the second-side recess thereof.

In a specific preferred embodiment, the first-side and second-side recesses of the light shielding column are preferably joined together.

In another preferred embodiment, each of the first and second color filter columns preferably has at least one recess in the intercolumnar non-overlap area.

In yet another preferred embodiment, the first side of the second color filter column preferably has at least one first-side recess, which recedes from the first side of the second color filter column toward the second side thereof in the row direction, in the intercolumnar non-overlap area. The second side of the first color filter column preferably has at least one second-side recess, which recedes from the second side of the first color filter column toward the first side thereof in the row direction, in the intercolumnar non-overlap area.

In a specific preferred embodiment, the first-side recess of the second color filter column is preferably provided so as to face the second-side recess of the first color filter column with the light shielding column interposed between the first and second color filter columns.

In another preferred embodiment, each of the light shielding column and the first and second color filter columns preferably has at least one recess in the intercolumnar non-overlap area.

In this particular preferred embodiment, each of the first color filter column, the light shielding column and the second color filter column preferably has a first side and a second side, which define its width in the row direction. If a direction, which is pointed from the first side of the first color filter column, the light shielding column or the second color filter column toward the second side thereof and parallel to the row direction, is called +x direction, the first color filter column, the light shielding column and the second color filter column are preferably arranged in this order in the +x direction. The first side of the light shielding column preferably has at least one first-side recess, which recedes from the first side of the light shielding column toward the second side thereof in the row direction, in the intercolumnar non-overlap area. The second side of the light shielding column preferably has at least one second-side recess, which recedes from the second side of the light shielding column toward the first side thereof in the row direction, in the intercolumnar non-overlap area. The first side of the second color filter column preferably has at least one first-side recess, which recedes from the first side of the second color filter column toward the second side thereof in the row direction, in the intercolumnar non-overlap area. The second side of the first color filter column preferably has at least one second-side recess, which recedes from the second side of the first color filter column toward the first side thereof in the row direction, in the intercolumnar non-overlap area.

In one preferred embodiment, the first-side recess of the light shielding column is preferably opposed to the second-side recess thereof.

In a specific preferred embodiment, the first-side and second-side recesses of the light shielding column are preferably joined together.

In yet another preferred embodiment, the second-side recess of the first color filter column is opposed to the first-side recess of the second color filter column.

More specifically, the first-side recess of the second color filter column and the second-side recess of the first color filter column are preferably joined together by way of the first-side and second-side recesses of the light shielding column.

In yet another preferred embodiment, the intercolumnar non-overlap area is preferably arranged so as to face a data signal line on an active-matrix substrate, which is opposed to the color filter substrate with a display medium layer interposed between the two substrates.

In a specific preferred embodiment, the data signal line preferably includes a plurality of branches and a conductive portion that connects the branches together, and the intercolumnar non-overlap area is preferably provided so as to face the conductive portion.

In one preferred embodiment of the present invention, the display device may be a liquid crystal display device, and the color filter substrate preferably has a protrusion for controlling orientations of liquid crystal molecules in an area associated with each said pixel.

A display device according to a preferred embodiment of the present invention preferably includes a color filter substrate according to any of the preferred embodiments of the present invention described above, an active-matrix substrate, which is provided so as to face the color filter substrate, and a display medium layer, which is interposed between the color filter substrate and the active-matrix substrate.

In a specific preferred embodiment, the display device is preferably a liquid crystal display device, and the active-matrix substrate preferably includes a pixel electrode, which has a slit.

In this particular preferred embodiment, an electrically connecting portion, associated with a shorter side that intersects with a direction in which the slit extends, is preferably arranged so as to overlap with the light shielding layer or a storage capacitor line on the active-matrix substrate.

A method for fabricating a liquid crystal display device according to a preferred embodiment of the present invention preferably includes the steps of: subjecting a color filter substrate and an active-matrix substrate to a baking process; forming an alignment film on each of these substrates; cleaning and then baking the alignment film; and making an LCD panel by a dropping process.

Preferred embodiments of the present invention provide a color filter substrate that can eliminate those residual bubbles, which would otherwise be produced when an LCD panel is made by a dropping process, for example. And by using such a color filter substrate, an LCD with a wide viewing angle range, which has good display quality with no abnormal orientations or unevenness and with a high aperture ratio, can be obtained.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3A is a plan view illustrating a pixel of an LCD fabricated on the color filter substrate of the first preferred embodiment.

FIG. 3B is a plan view illustrating the location of a slit pattern on transparent pixel electrodes with respect to the light shielding layer.

FIG. 3C illustrates a source line on a larger scale.

Figure 2:
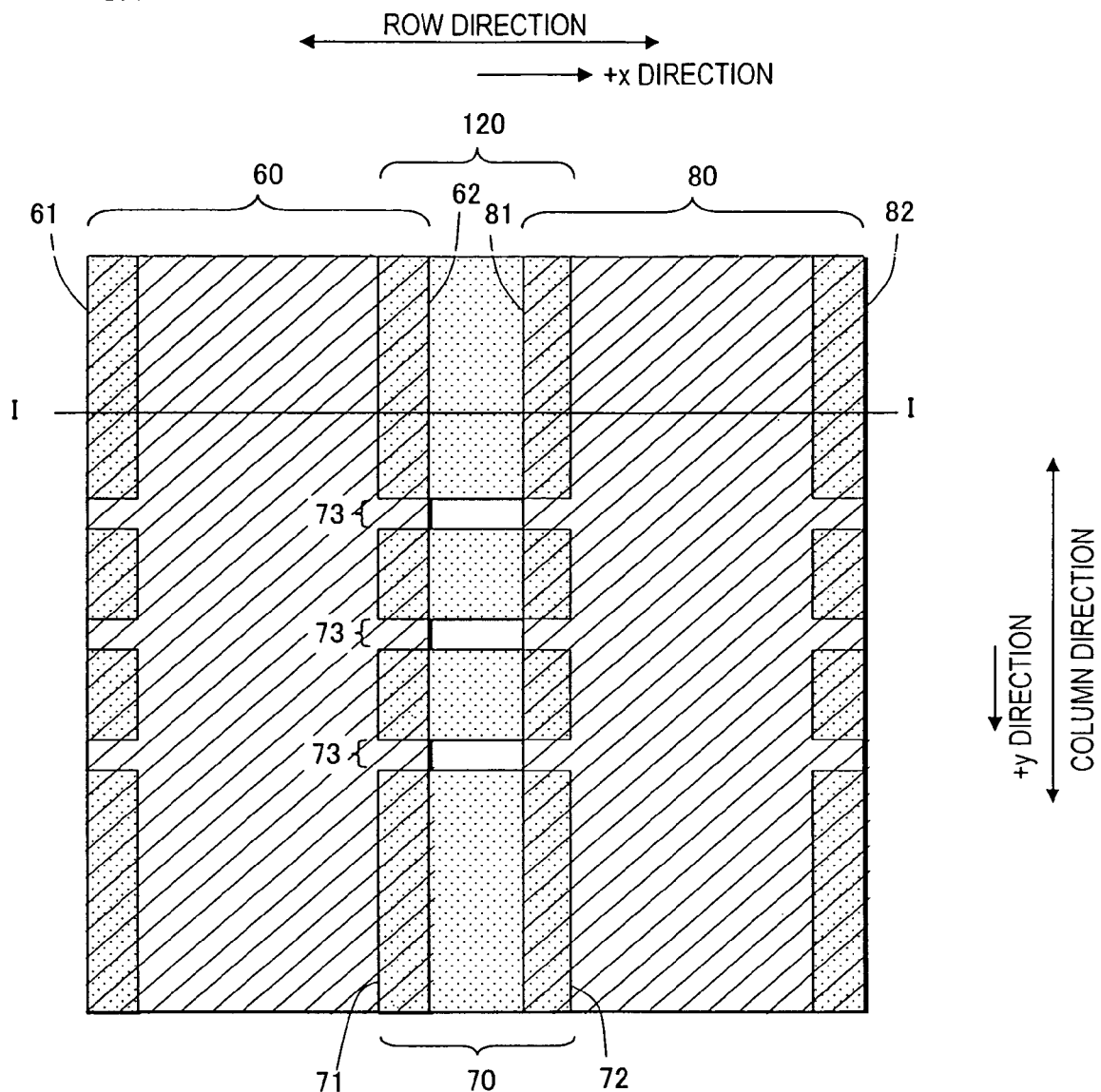
FIG. 2 is a plan view illustrating a color filter substrate according to a first specific preferred embodiment of the present invention.

Portion (a) of FIG. 6 is a partial enlarged view of the color filter substrate shown in FIG. 2.

Portion (b) of FIG. 6 is a cross-sectional view of the color filter substrate shown in portion (a) of FIG. 6 as viewed on the plane VIb-VIb.

Portion (c) of FIG. 6 is a cross-sectional view of the color filter substrate shown in portion (a) of FIG. 6 as viewed on the plane VIc-VIc.

Figure 7B:
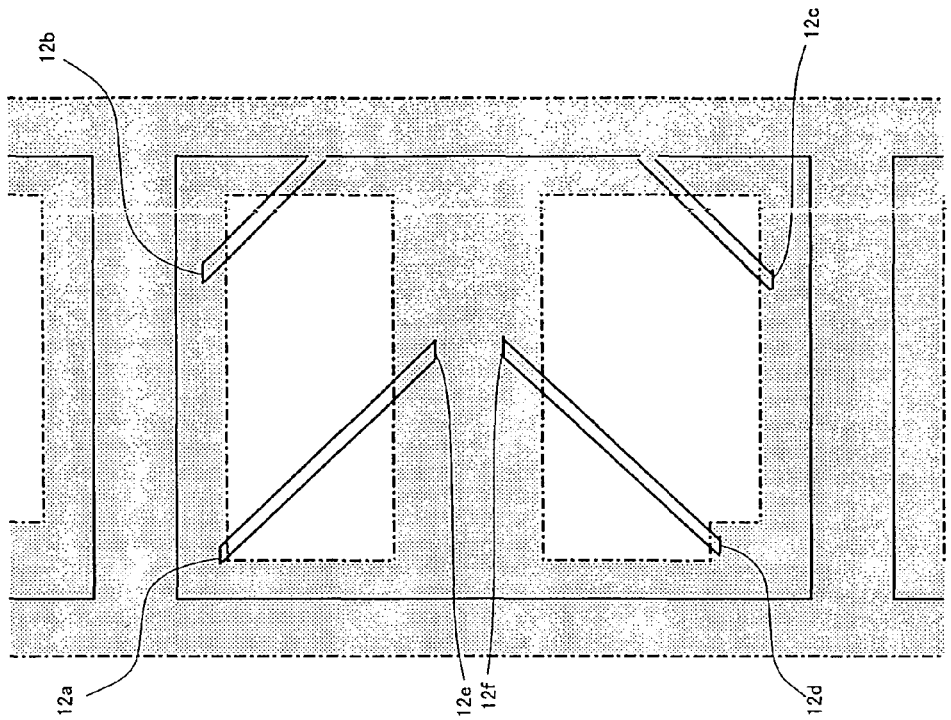
Figure 7A:
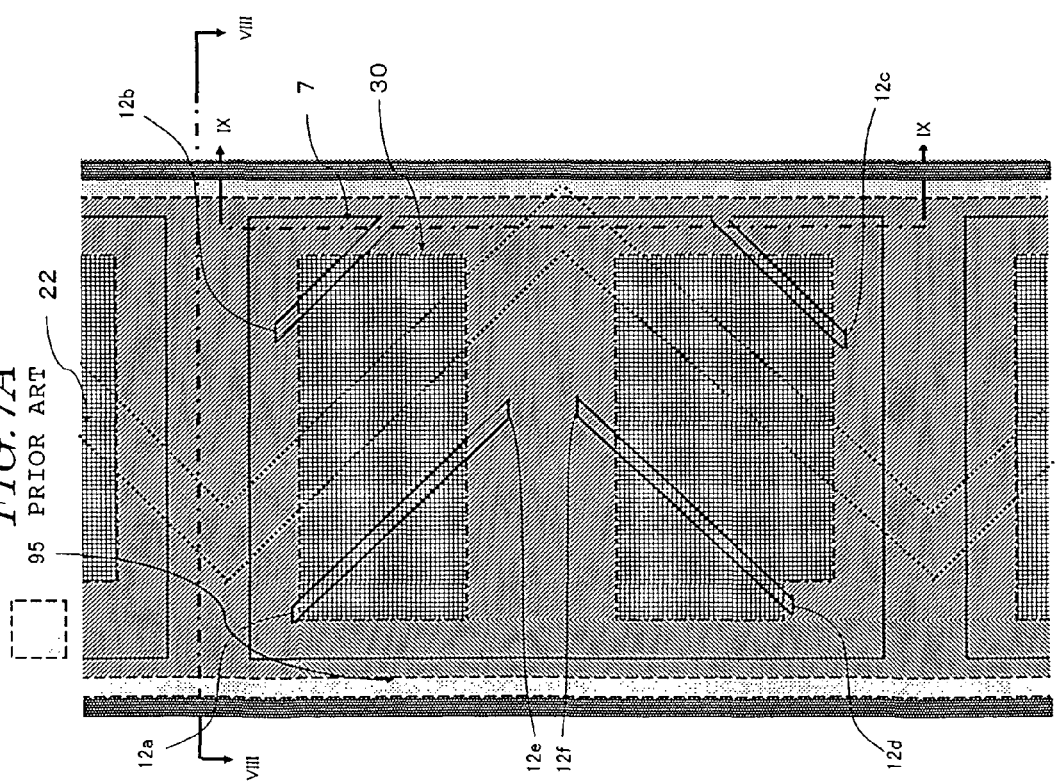

FIG. 7A is a plan view illustrating a pixel of an LCD fabricated on a conventional color filter substrate.

FIG. 7B is a plan view illustrating the locations of transparent pixel electrodes with respect to an light shielding column.

Figure 8:
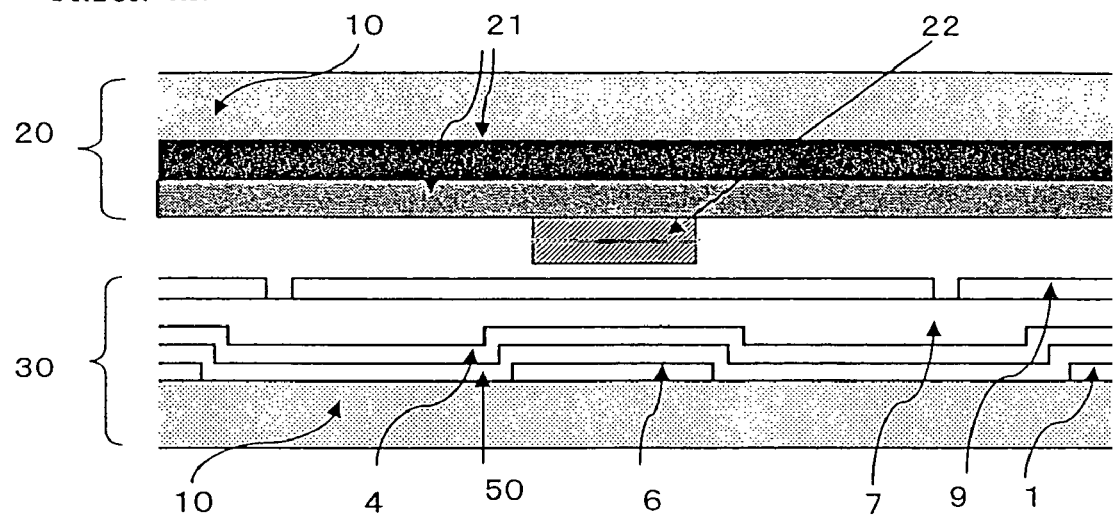

FIG. 8 is a cross-sectional view of the LCD shown in FIG. 7A as viewed on the plane VIII-VIII shown in FIG. 7A.

Figure 9:
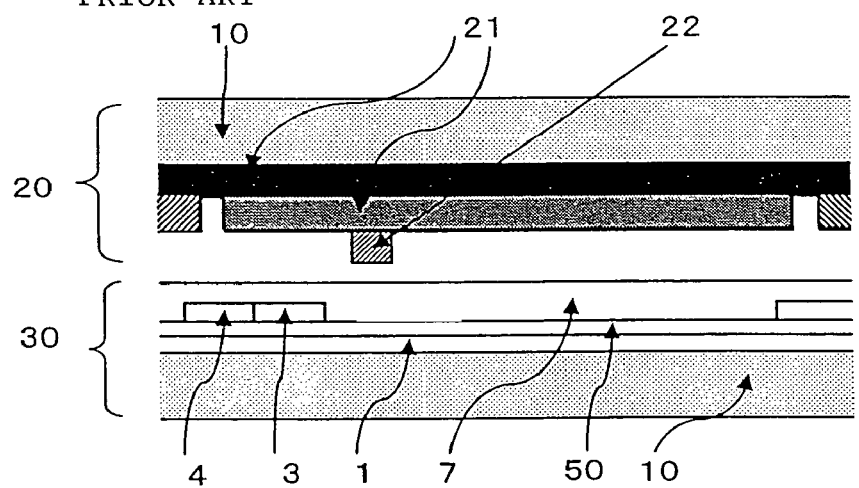

FIG. 9 is a cross-sectional view of the LCD shown in FIG. 7A as viewed on the plane IX-IX shown in FIG. 7A.

Portion (a) of FIG. 10A is a plan view illustrating a color filter substrate according to a modified example of the first preferred embodiment of the present invention.

Portion (b) of FIG. 10A is a cross-sectional view of the color filter substrate shown in portion (a) of FIG. 10A as viewed on the plane XAb-XAb.

Portion (c) of FIG. 10A is a cross-sectional view of the color filter substrate shown in portion (a) of FIG. 10A as viewed on the plane XAc-XAc.

Figure 10B:
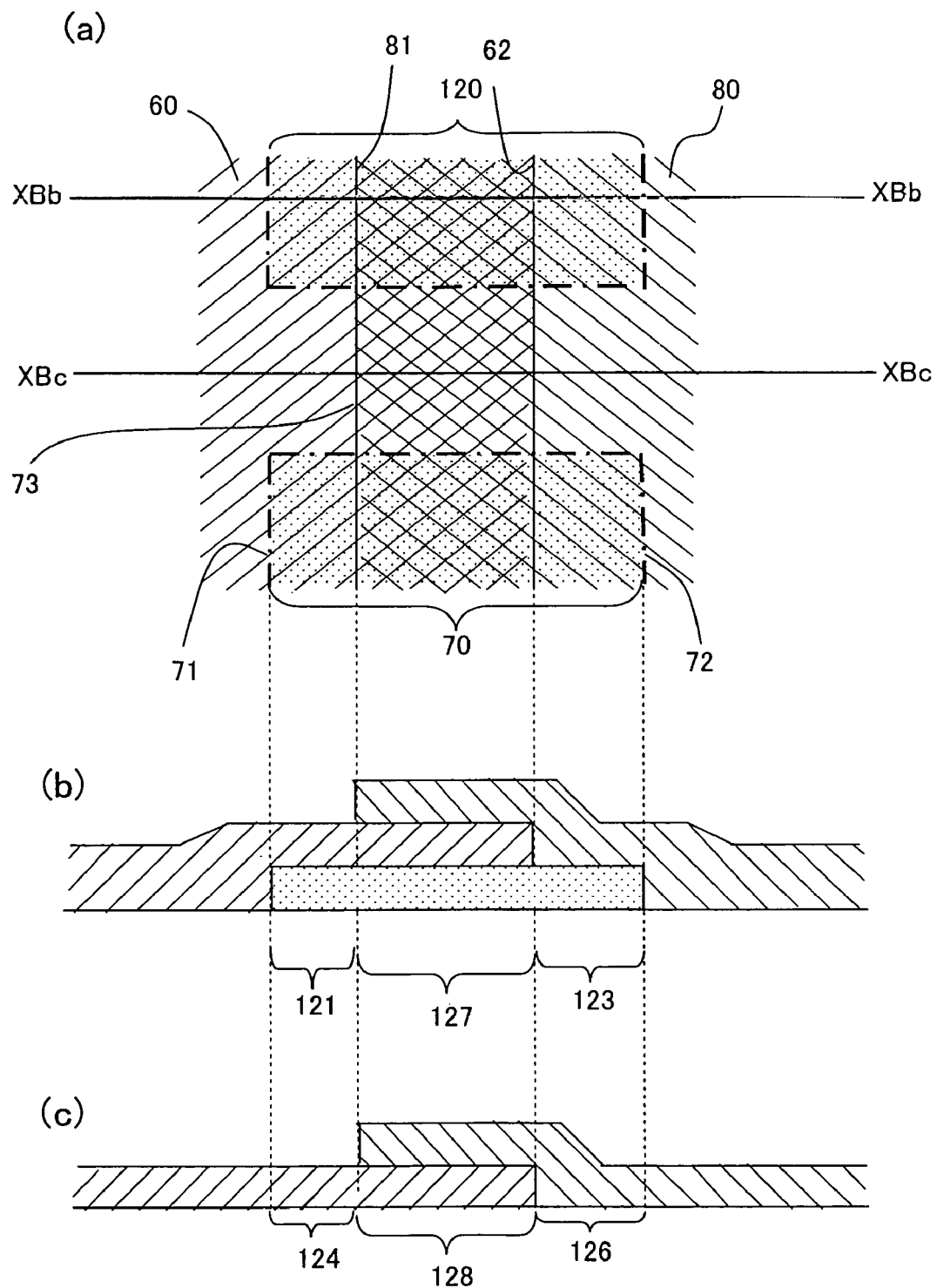

Portion (a) of FIG. 10B is a plan view illustrating a color filter substrate according to another modified example of the first preferred embodiment.

Portion (b) of FIG. 10B is a cross-sectional view of the color filter substrate shown in portion (a) of FIG. 10B as viewed on the plane XBb-XBb.

Portion (c) of FIG. 10B is a cross-sectional view of the color filter substrate shown in portion (a) of FIG. 10B as viewed on the plane XBc-XBc.

Portion (a) of FIG. 10C is a plan view illustrating a color filter substrate according to yet another modified example of the first preferred embodiment.

Portion (b) of FIG. 10C is a cross-sectional view of the color filter substrate shown in portion (a) of FIG. 10C as viewed on the plane XCb-XCb.

Portion (c) of FIG. 10C is a cross-sectional view of the color filter substrate shown in portion (a) of FIG. 10C as viewed on the plane XCc-XCc.

Figure 11:
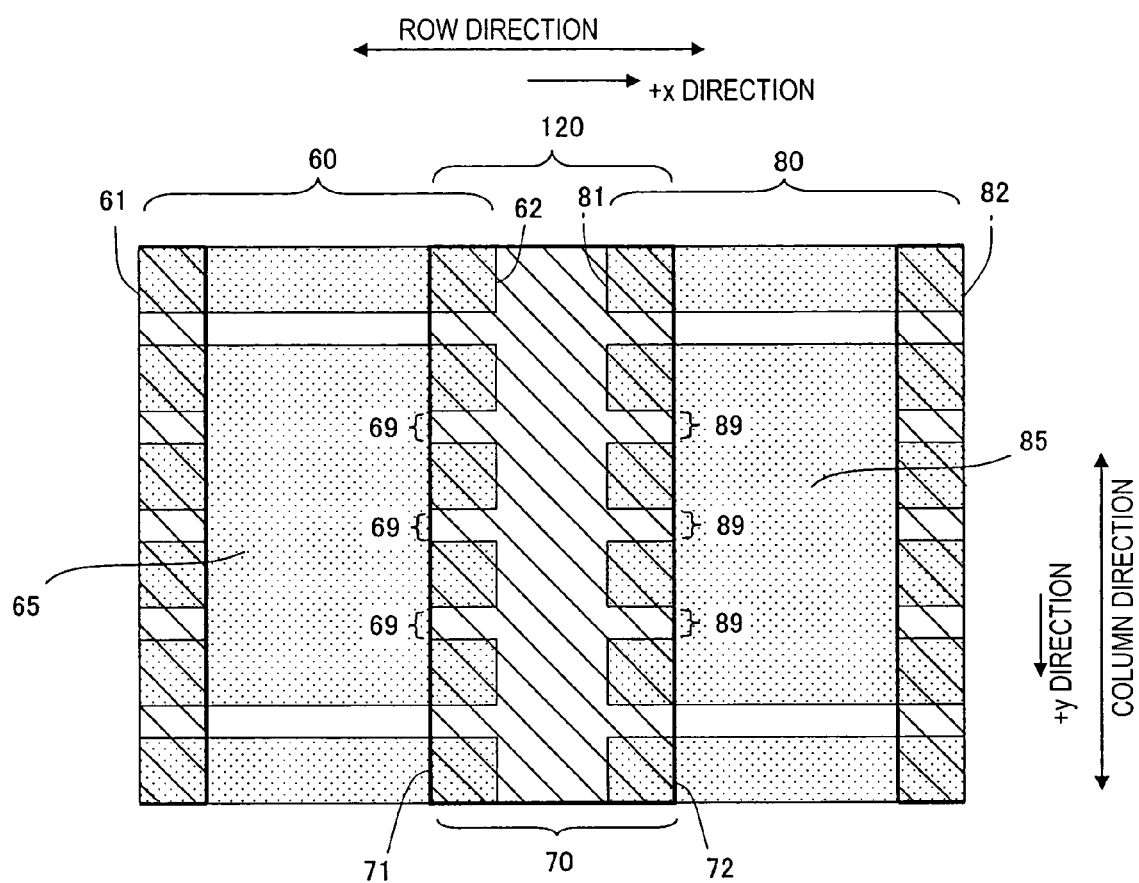

FIG. 11 is a plan view illustrating a color filter substrate according to a second specific preferred embodiment of the present invention.

Figure 12:
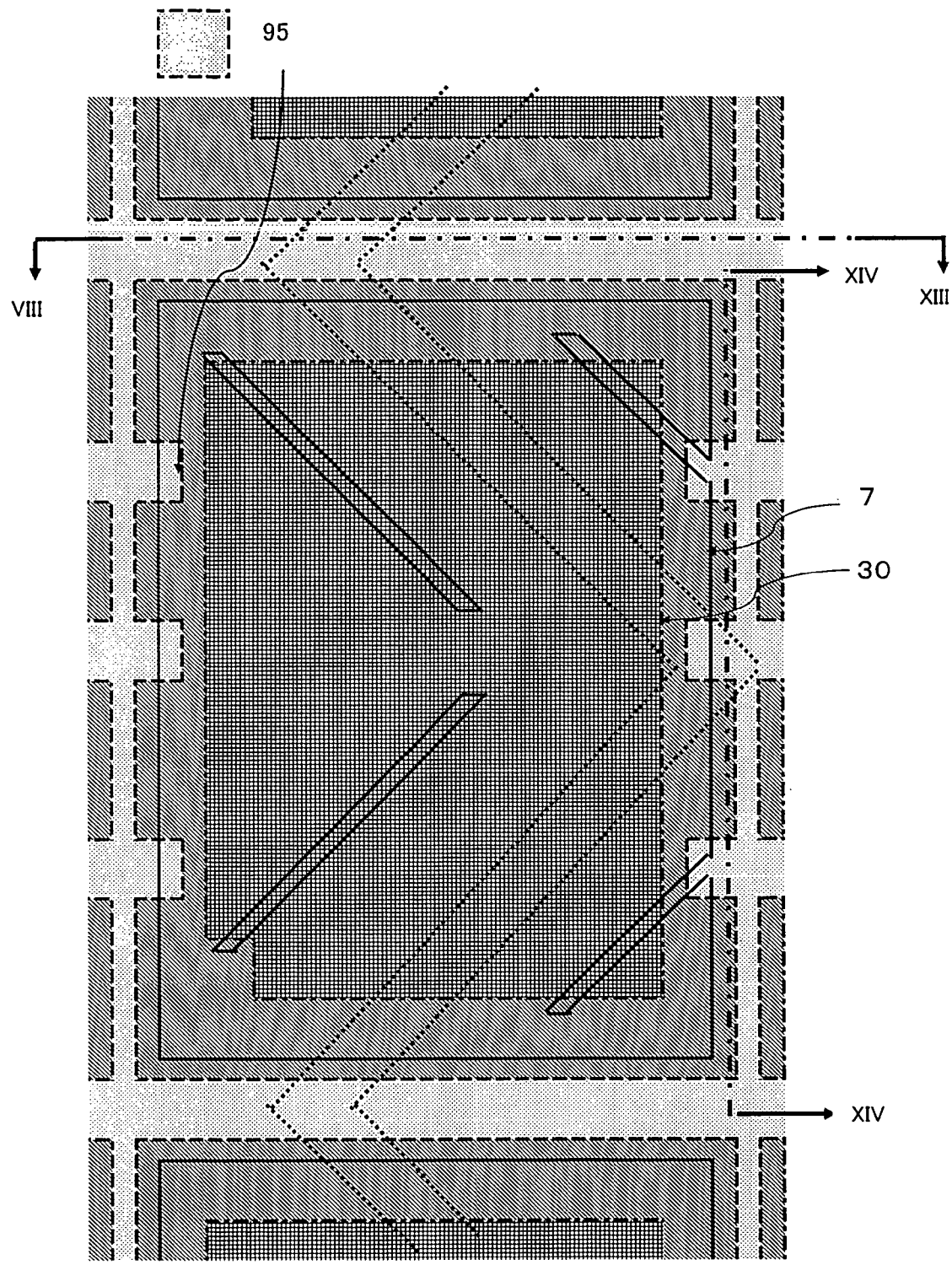

FIG. 12 is a plan view illustrating a pixel of an LCD fabricated on the color filter substrate of the second preferred embodiment.

Figure 13:
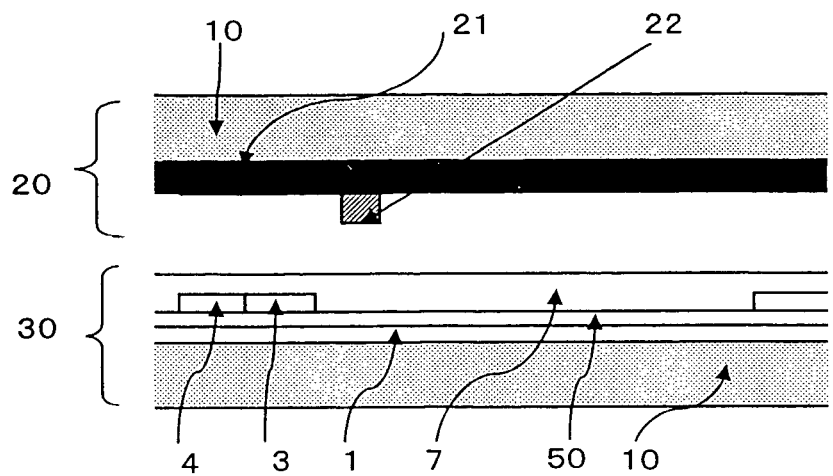

FIG. 13 is a cross-sectional view of the LCD shown in FIG. 12 as viewed on the plane XIII-XIII.

Figure 14:
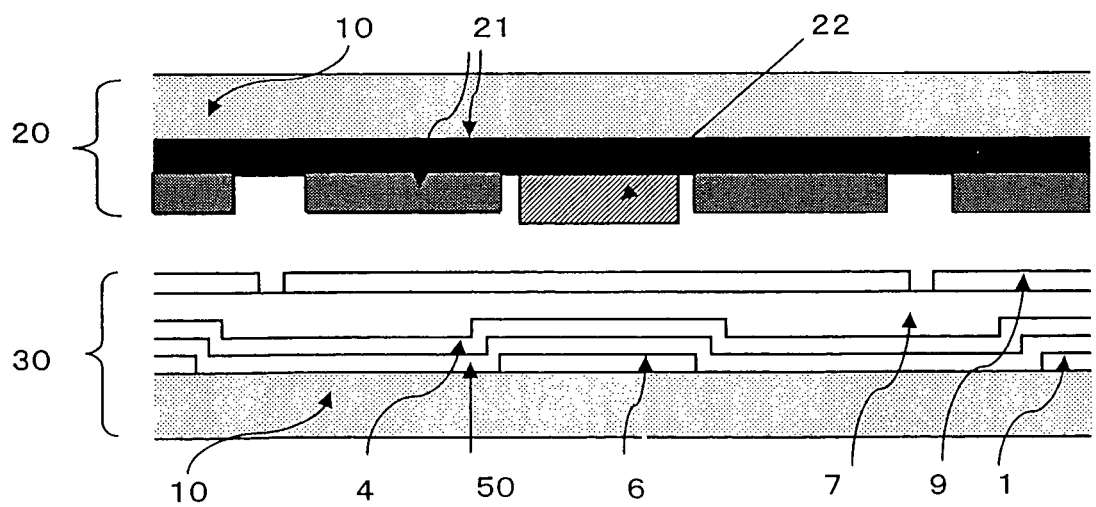

FIG. 14 is a cross-sectional view of the LCD shown in FIG. 12 as viewed on the plane XIV-XIV.

Figure 15:
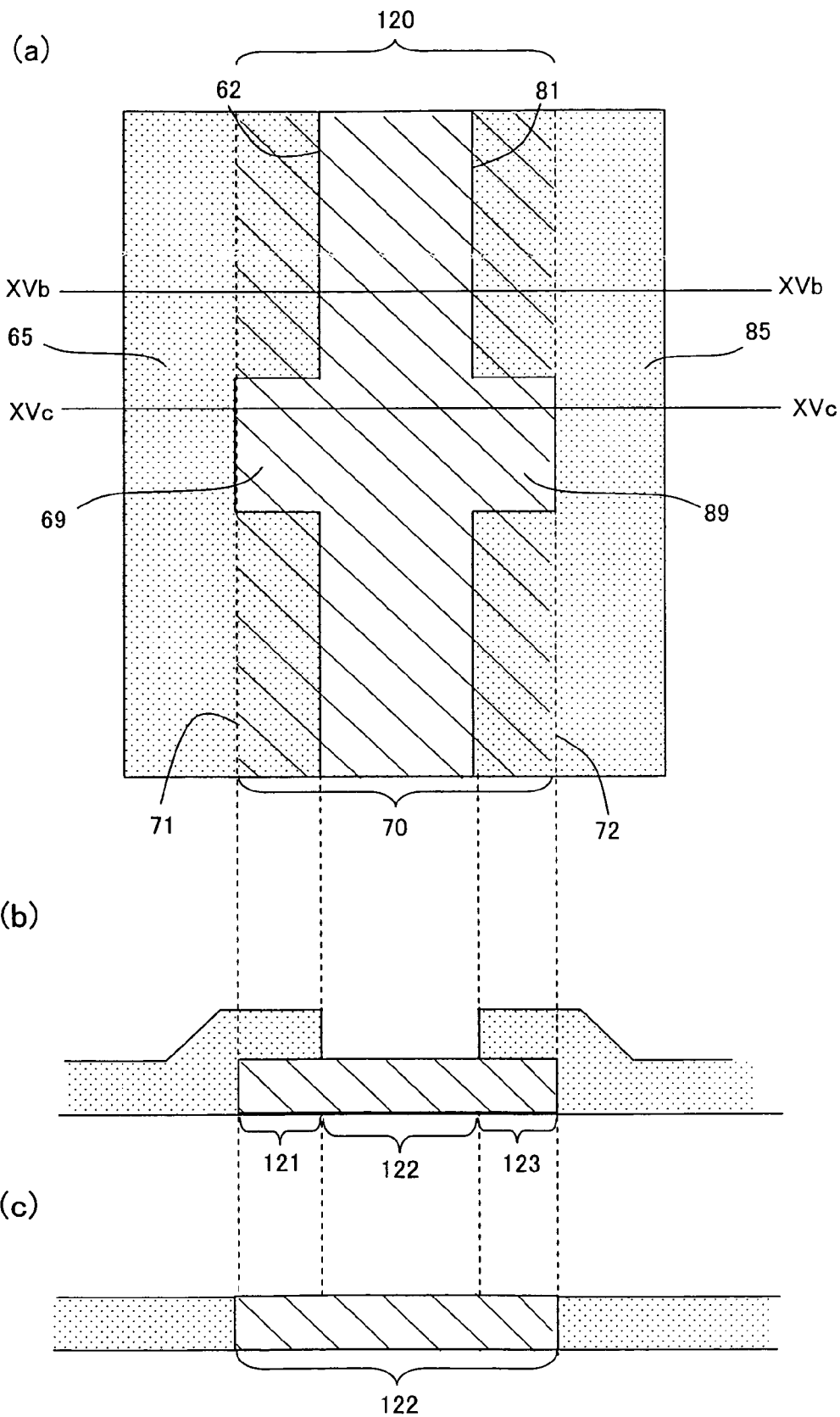

Portion (a) of FIG. 15 is a partial enlarged view of the color filter substrate shown in FIG. 12.

Portion (b) of FIG. 15 is a cross-sectional view of the color filter substrate shown in portion (a) of FIG. 15 as viewed on the plane XVb-XVb.

Portion (c) of FIG. 15 is a cross-sectional view of the color filter substrate shown in portion (a) of FIG. 15 as viewed on the plane XVc-XVc.

Figure 16:
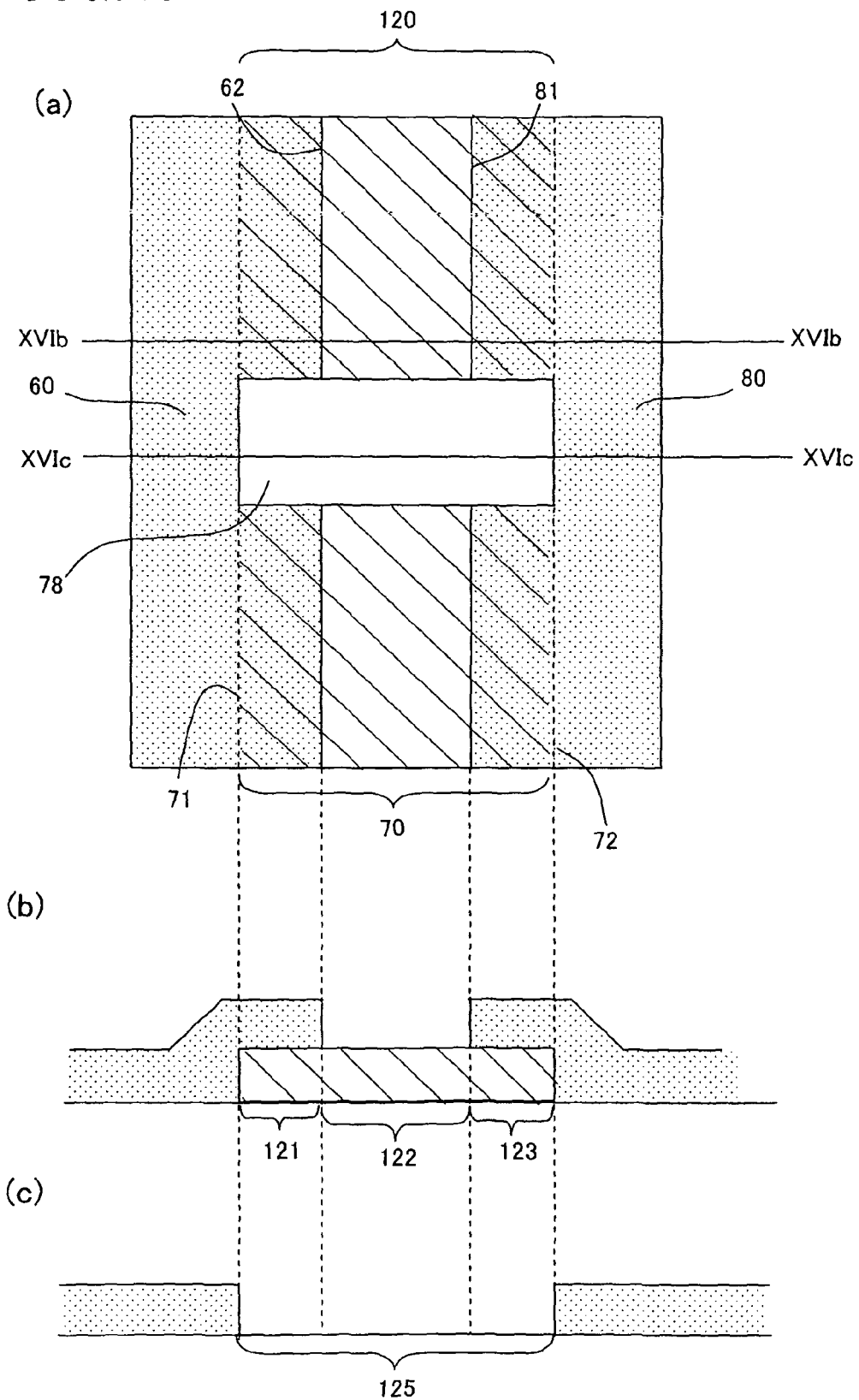

Portion (a) of FIG. 16 is a partial enlarged view of a color filter substrate according to a modified example of the second preferred embodiment of the present invention.

Portion (b) of FIG. 16 is a cross-sectional view of the color filter substrate shown in portion (a) of FIG. 16 as viewed on the plane XVIb-XVIb.

Portion (c) of FIG. 16 is a cross-sectional view of the color filter substrate shown in portion (a) of FIG. 16 as viewed on the plane XVIc-XVIc.

FIG. 17 is a plan view illustrating a color filter substrate according to a third specific preferred embodiment of the present invention.

FIGS. 18A and 18B are plan views illustrating a pixel of an LCD fabricated on the color filter substrate of the third preferred embodiment.

Portion (a) of FIG. 19 is a partial enlarged view of the color filter substrate shown in FIG. 18.

Portion (b) of FIG. 19 is a cross-sectional view of the color filter substrate shown in portion (a) of FIG. 19 as viewed on the plane XIXb-XIXb.

Portion (c) of FIG. 19 is a cross-sectional view of the color filter substrate shown in portion (a) of FIG. 19 as viewed on the plane XIXc-XIXc.

Figure 20:
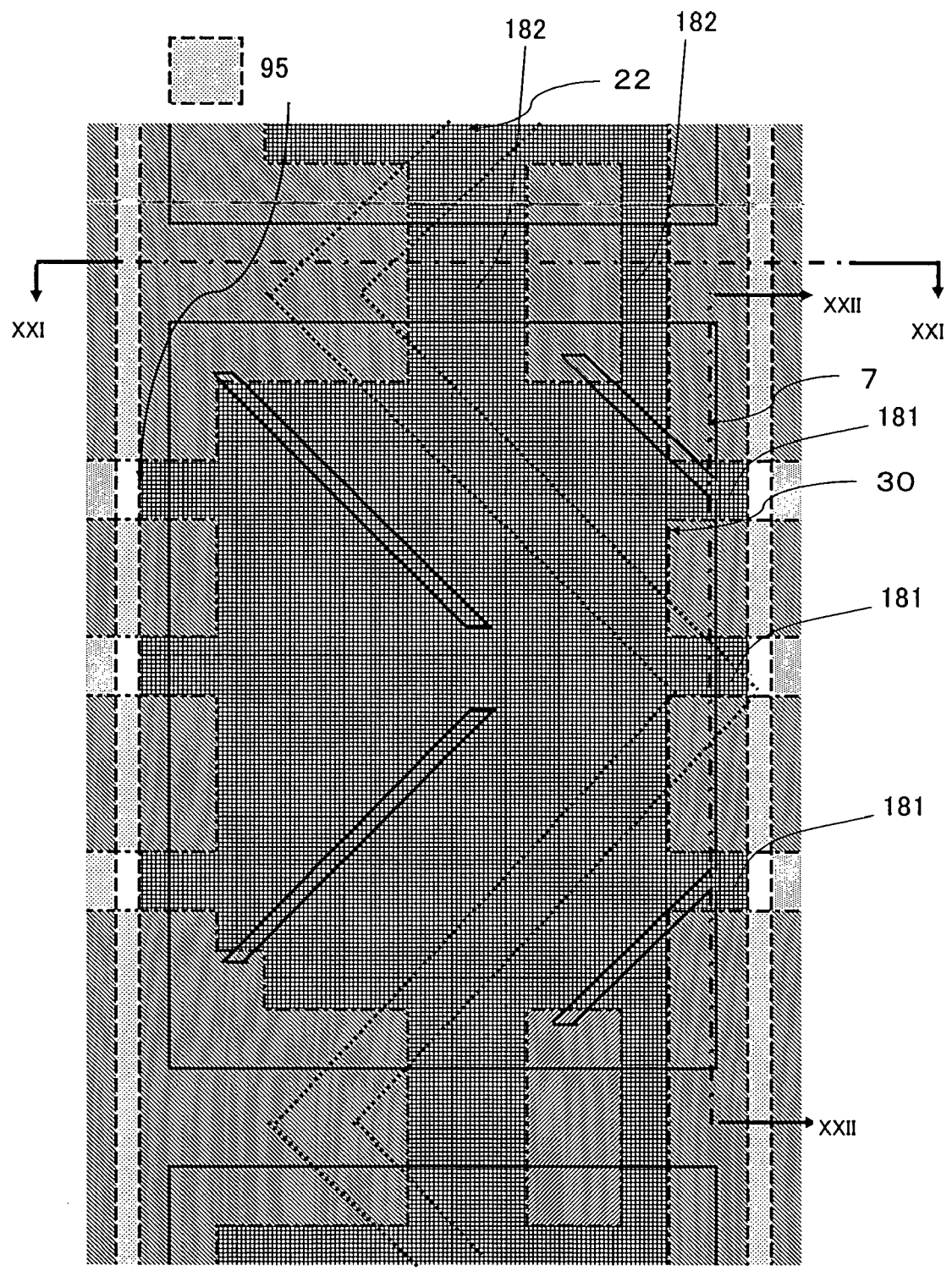

FIG. 20 is a plan view illustrating a pixel of an LCD fabricated on a color filter substrate according to a fourth specific preferred embodiment of the present invention.

Figure 21:
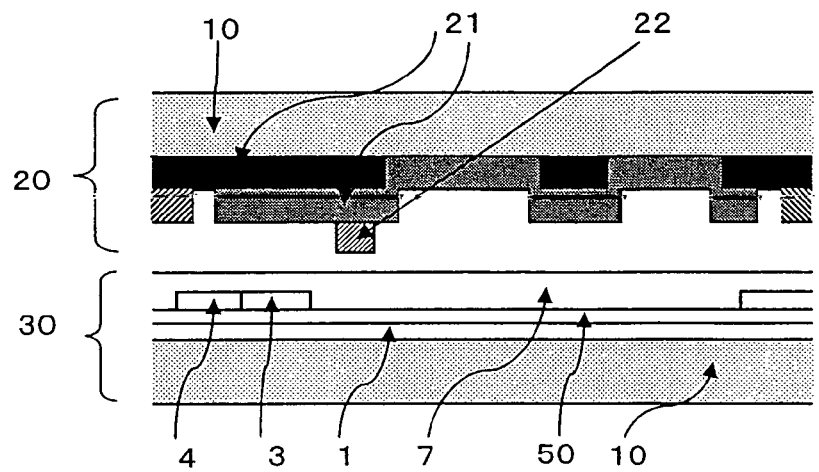

FIG. 21 is a cross-sectional view of the LCD shown in FIG. 20 as viewed on the plane XXI-XXI.

Figure 22:
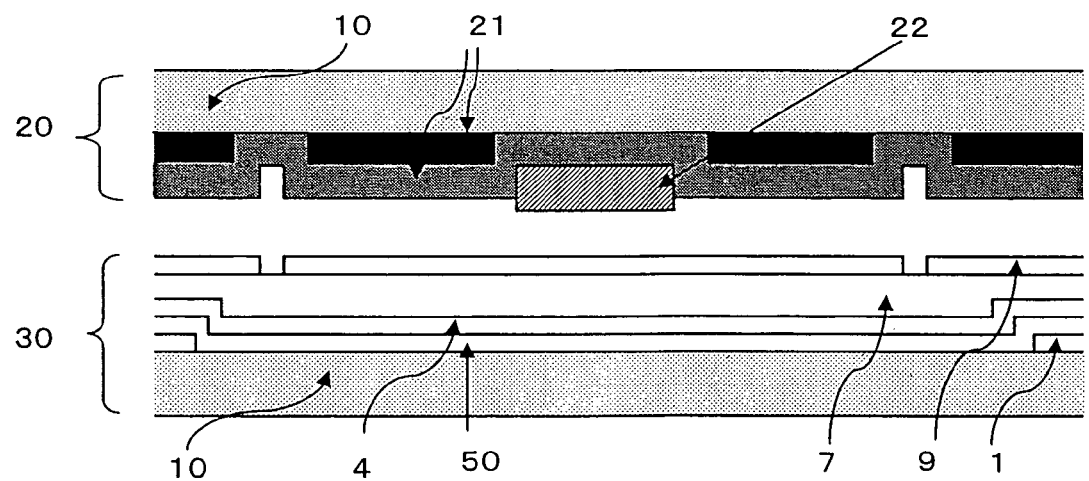

FIG. 22 is a cross-sectional view of the LCD shown in FIG. 20 as viewed on the plane XXII-XXII.

Figures 23A, 23B:
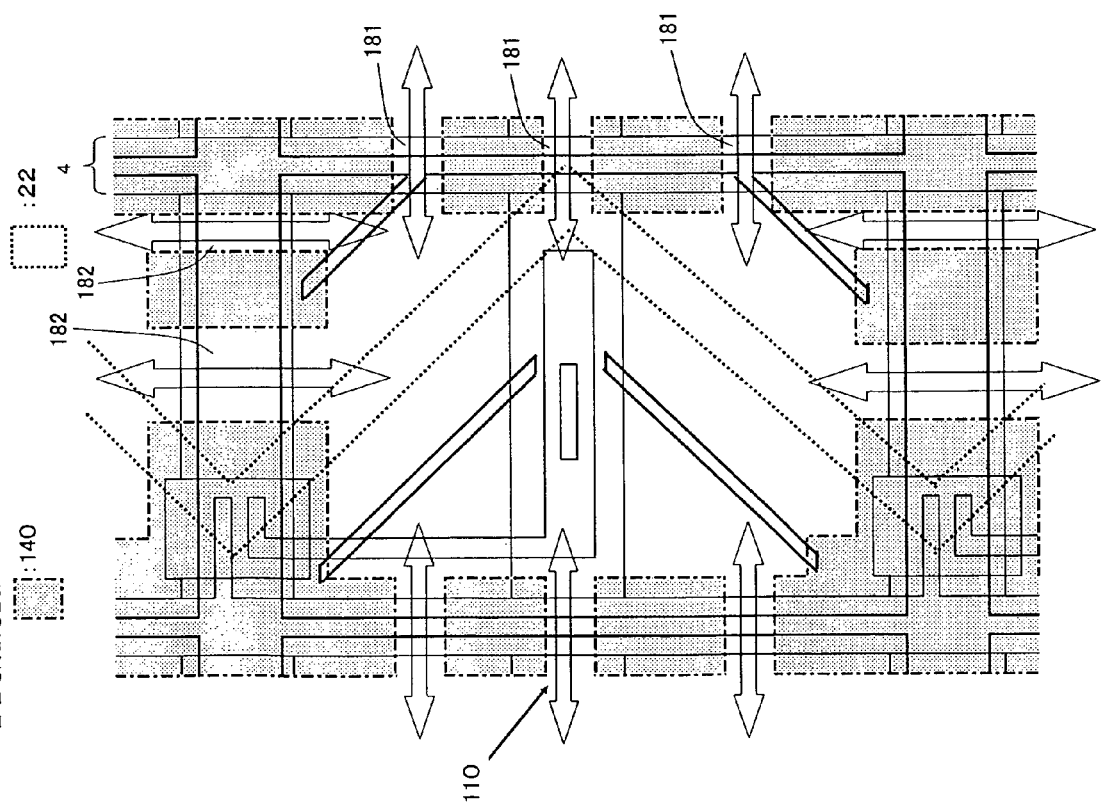

FIG. 23A is a plan view illustrating a pixel of an LCD fabricated on a color filter substrate according to a modified example of the fourth preferred embodiment of the present invention.

FIG. 23B is a plan view illustrating the locations of transparent pixel electrodes with respect to an light shielding column.

Figure 24:
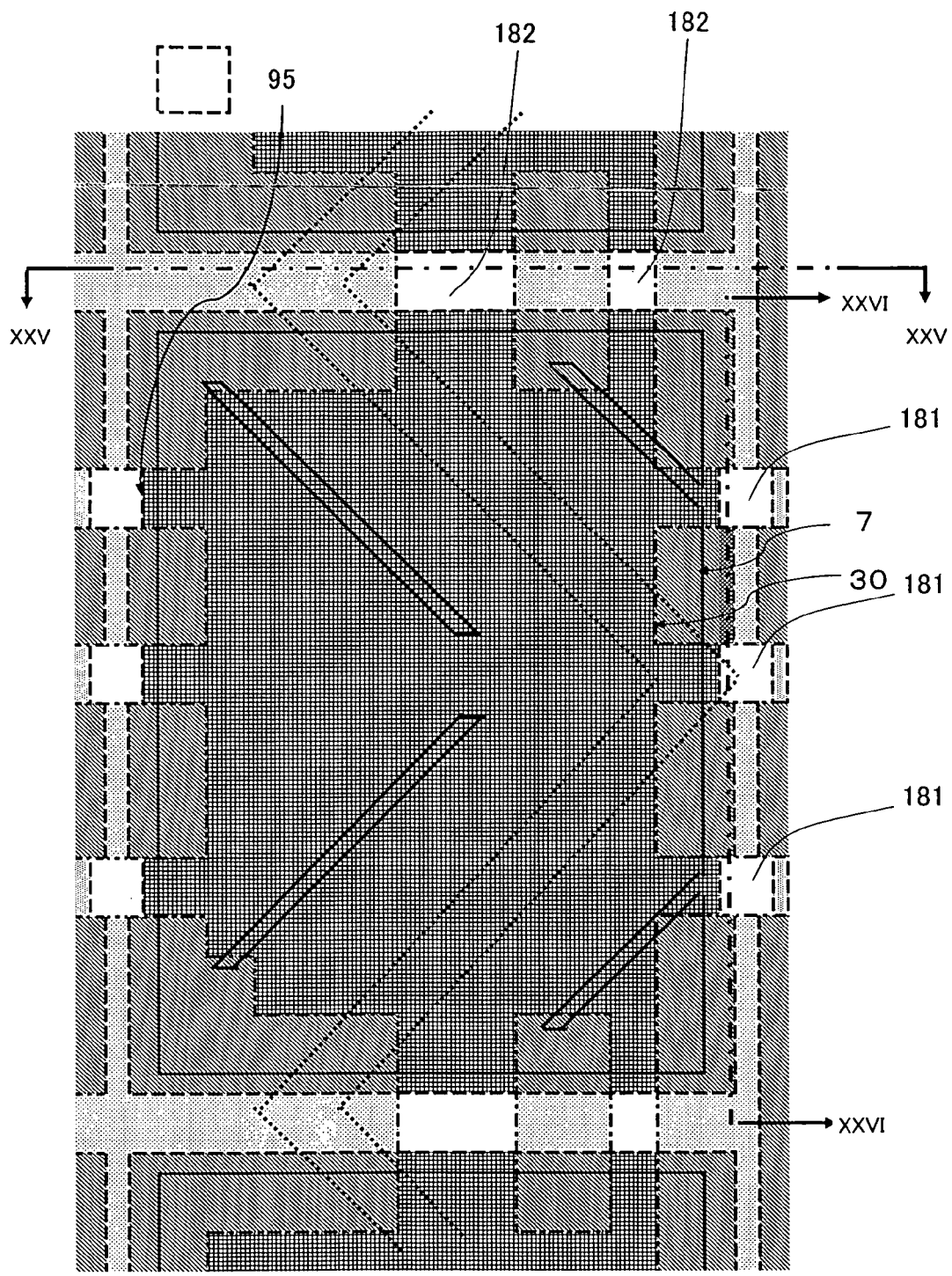

FIG. 24 is a plan view illustrating a pixel of an LCD fabricated on a color filter substrate according to a fifth specific preferred embodiment of the present invention.

Figure 25:
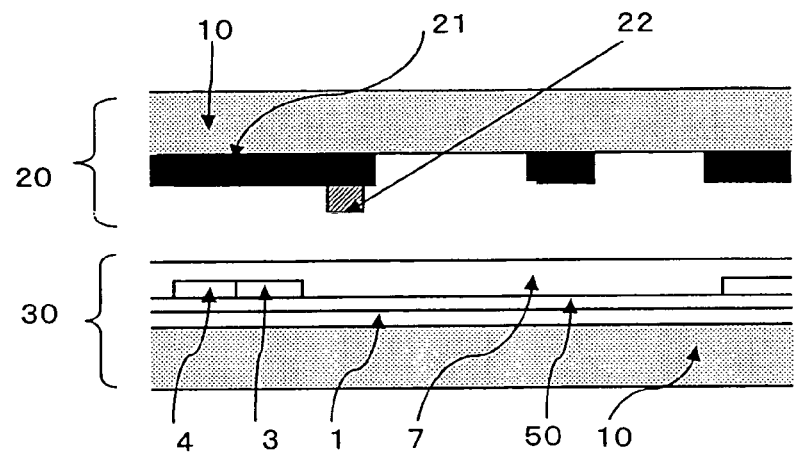

FIG. 25 is a cross-sectional view of the LCD shown in FIG. 24 as viewed on the plane XXV-XXV.

Figure 26:
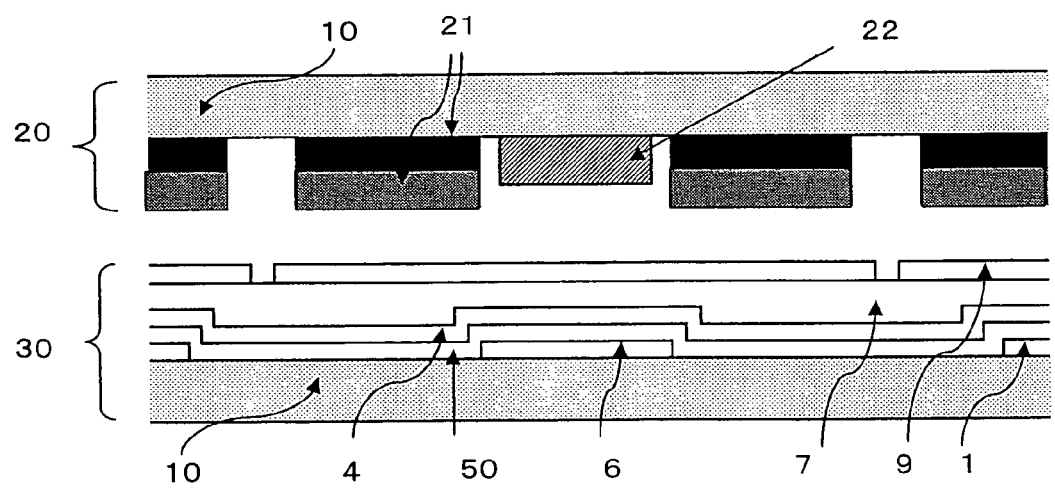

FIG. 26 is a cross-sectional view of the LCD shown in FIG. 24 as viewed on the plane XXVI-XXVI.

Figure 27:
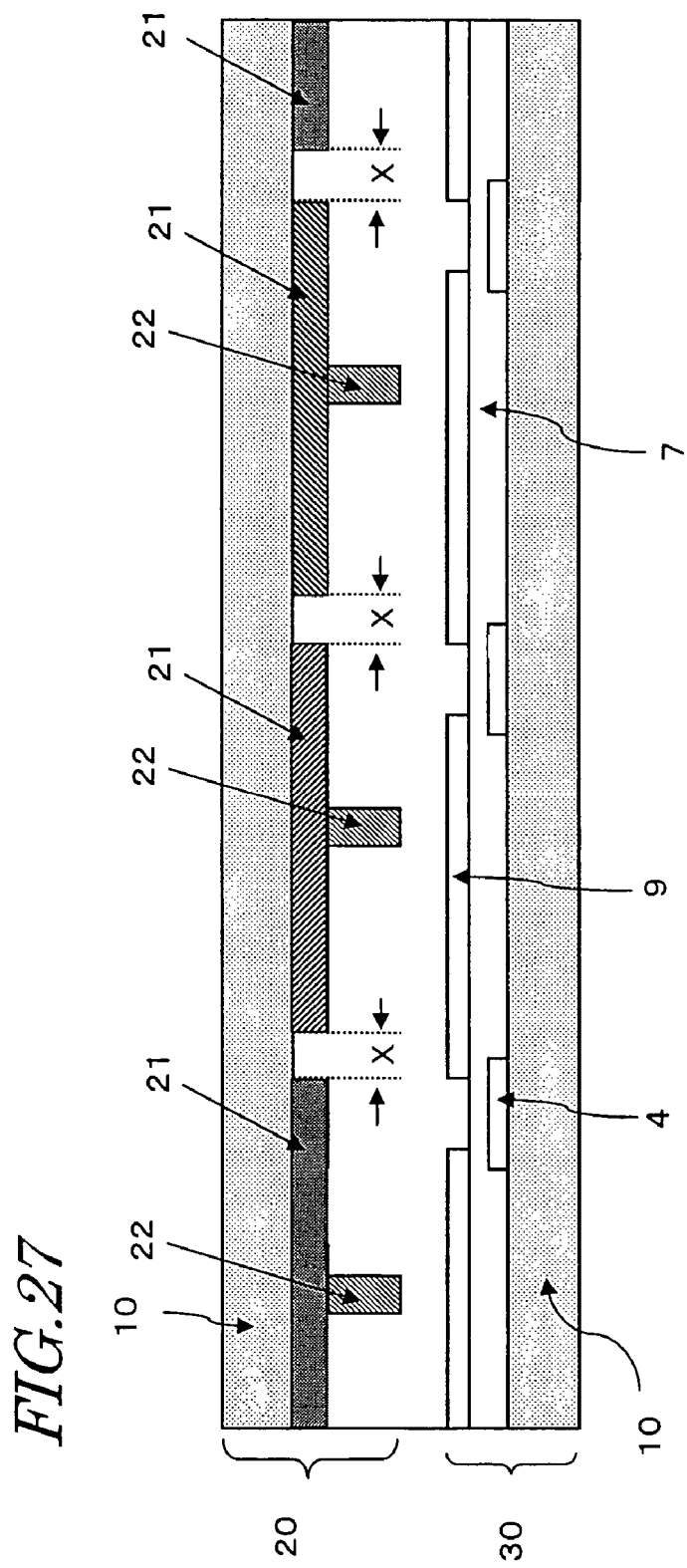

FIG. 27 is a cross-sectional view as viewed on the plane XXVII-XXVII shown in FIG. 3A to illustrate a situation where misalignment has occurred in the row direction while the LCD shown in FIG. 3A is fabricated.

DETAILED DESCRIPTION OF PREFERRED EMBODIMENTS

Hereinafter, the basic idea of a color filter substrate according to every preferred embodiment of the present invention will be described with reference to the accompanying drawings.

A color filter substrate according to a preferred embodiment of the present invention is preferably used in a display device including a plurality of pixels that are arranged in columns and rows to define a matrix pattern. As used herein, the "matrix pattern" typically refers to a striped arrangement in which a number of pixels are arranged along data signal lines (i.e., in the column direction) and along scan signal lines (i.e., in the row direction). But the matrix pattern is not limited to the striped arrangement but may also refer to a delta arrangement, for example. In the following description, preferred embodiments of the present invention will be described as being applied to a color filter substrate with color filters in such a striped arrangement for use in an active-matrix-addressed LCD, for example. It should be noted, however, that the present invention is in no way limited to those specific preferred embodiments.

First, the structure of a normal MVA mode active-matrix-addressed LCD 100 will be described with reference to FIG. 1, which schematically illustrates a cross section of such an LCD.

Figure 1:
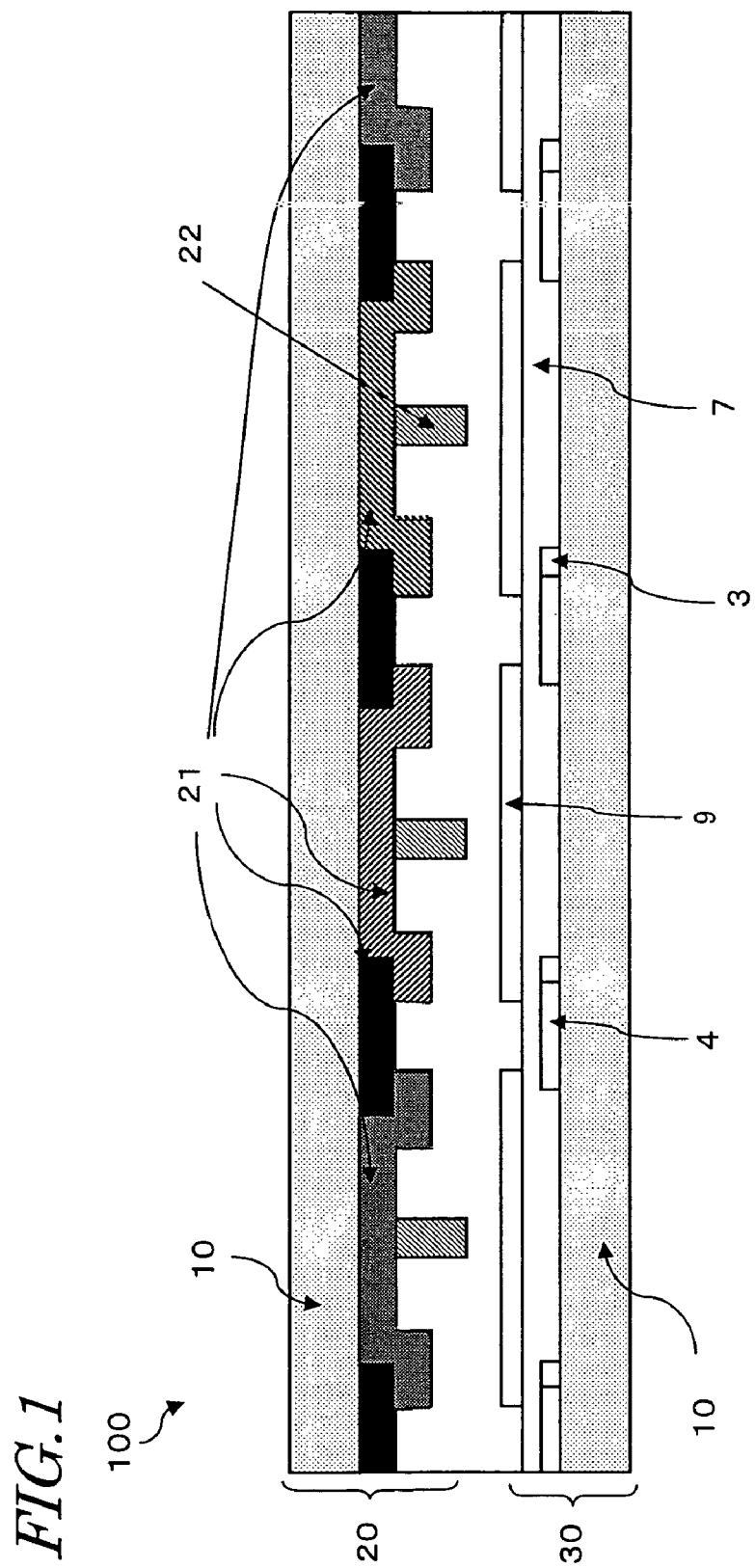
FIG. 1 is a cross-sectional view illustrating a normal active-matrix-addressed LCD.

As shown in FIG. 1, the LCD 100 preferably includes an active-matrix substrate 30 and a color filter substrate 20, which are arranged so as to face each other, and a liquid crystal layer (not shown) interposed between these substrates.

The active-matrix substrate 30 preferably includes a transparent insulating substrate 10 of glass, for example, and gate lines (not shown) as scan signal lines, source lines 4 as data signal lines, active components 3 such as thin-film transistors (TFTs), and transparent pixel electrodes 9, which are all provided on the transparent insulating substrate 10. The transparent pixel electrodes 9 are preferably arranged in a matrix pattern in the display area.

The color filter substrate 20 preferably includes a transparent insulating substrate 10 of glass, and a plurality of coloring layers 21, a counter electrode (not shown) with protrusions 22 for controlling orientations, and an alignment film (not shown, either), which are all provided on the transparent insulating substrate 10. The alignment film is preferably provided so as to cover all of the other members. The coloring layers 21 preferably include a number of color filter layers and an light shielding layer. In FIG. 1, the coloring layers 21 include four color filter layers and an light shielding layer.

Each color filter layer preferably includes a plurality of "color filter columns", which are arranged along columns of pixels (which will be sometimes referred to herein as "pixel columns"), and a plurality of "color filter rows", which are arranged along rows of pixels (which will be sometimes referred to herein as "pixel rows"). Each "color filter column" preferably includes multiple color filters of the same color, which are typically combined with portions that are shielded from light with gate bus lines, thereby forming a strip of color filters. However, the "color filter column" is not limited to this specific arrangement but may also refer to a set of multiple "color filter portions", which are arranged separately for respective pixels. Meanwhile, in each color filter row, color filters of mutually different colors are arranged cyclically (e.g., in the order of red (R), green (G) and blue (B)). It should be noted that a separate color filter associated with a single pixel will be referred to herein as a "color filter portion".

On the other hand, the light shielding layer preferably includes a plurality of "light shielding columns", which are arranged in gaps between adjacent pixel columns, and a plurality of "light shielding rows", which are arranged in gaps between adjacent pixel rows. It should be noted that if each color filter column is provided as a strip of color filters, not as the arrangement of multiple separate color filter portions, then no "light shielding rows" should be provided. An area defined in the gap between two adjacent pixel columns will be referred to herein as an "intercolumnar area", while an area defined in the gap between two adjacent pixel rows will be referred to herein as an "interrow area".

Also, the "first side" and "second side" of a color filter column (including a set of color filter portions) or an light shielding column refer to herein a pair of sides that defines its width as measured in the row direction. If a color filter column includes a plurality of color filter portions, then the "third side" and "fourth side" of each color filter portion or an light shielding row refer to herein a pair of sides that defines its width as measured in the column direction.

Hereinafter, preferred embodiments of the present invention will be described with reference to the accompanying drawings. In each of the following preferred embodiments, the present invention is applied to an MVA mode LCD in which slits are cut through pixel electrodes on an active-matrix substrate and in which protrusions are provided on a counter electrode on a color filter substrate for the purpose of controlling the orientations of liquid crystal molecules. However, the present invention is in no way limited to those specific preferred embodiments. Alternatively, the protrusions may be provided on the pixel electrodes on the active-matrix substrate and the slits may be cut through the counter electrode on the color filter substrate. As another alternative, the protrusions may be provided on both of the pixel electrodes and counter electrode or may be replaced with slits as well. Furthermore, the present invention is not limited to the MVA mode LCD but may also be applied to a TN mode LCD or an IPS mode LCD, too. Nevertheless, the present invention achieves most significant effects when applied to an MVA mode LCD with those protrusions because bubbles easily remain in such an LCD.

To prevent a multilayer structure, surrounding a pixel in an LCD, from obstructing the flow of a liquid crystal material injected into the pixel and producing residual bubbles there, an LCD according to a preferred embodiment of the present invention partially reduces the height of the multilayer structure by removing some of multiple layers that form the multilayer structure. The multilayer structure is provided around each pixel mainly for the purpose of shielding the pixel from light, and typically consists of either an light shielding layer (which is preferably a black matrix (BM)) and one or two color filter layers or a plurality of color filter layers.

It should be noted that the multilayer structure is not always provided so as to surround the pixel but may sometimes be selectively provided in a gap between two pixels that are adjacent to each other either in the row direction or in the column direction. Even so, the progress of the liquid crystal material is also obstructed in a direction that intersects with the multilayer structure. Thus, by removing some of the layers that form the multilayer structure, the production of residual bubbles can also be minimized.

Such an area from which at least some of the layers that form the multilayer structure have been removed will be referred to herein as a "non-overlap area", which includes an area from which all of those member layers of the multilayer structure have been removed. On the other hand, an "overlap area" refers to an area in which the largest number of layers obstruct the flow of the liquid crystal material.

In the following preferred embodiments, an arrangement in which the overlap area is defined by a multilayer structure consisting of an light shielding layer and color filter layers will be described as a typical example.

Embodiment 1

A first specific preferred embodiment of the present invention relates to a color filter substrate where in a gap between two pixels that are adjacent in a row direction, an intercolumnar overlap area, in which the light shielding column and at least one of the first and second color filter columns overlap each other, and an intercolumnar non-overlap area, in which the light shielding column is overlapped by neither the first color filter column nor the second color filter column, are defined, and where an light shielding column with at least one recess is provided for the intercolumnar non-overlap area so as to extend continuously in the row direction. More specifically, the color filter substrate of this preferred embodiment has an intercolumnar non-overlap area in which a first-side recess on the first side of the light shielding column and a second-side recess on the second side thereof are joined together to form an opening in the row direction.

As used herein, the "intercolumnar overlap area in which the light shielding column and at least one of the first and second color filter columns overlap each other" includes an area in which the light shielding column and the first color filter column overlap each other and an area in which the light shielding column and the second color filter column overlap each other. However, the "intercolumnar overlap area" does not always refer to such an area where the light shielding column and one of the first and second color filter columns overlap each other but also includes an area where the light shielding column and both of the first and second color filter columns overlap each other (i.e., an overlap area consisting of three layers).

On the other hand, the "intercolumnar non-overlap area" refers to an area in which the light shielding column is overlapped by neither the first color filter column nor the second color filter column and which includes an area where the first color filter column is provided by itself, an area where the second color filter column is provided by itself, an area where the light shielding column is provided by itself, an area where the first and second color filter columns overlap each other, and an area where none of these columns is present.

More specifically, the intercolumnar non-overlap area is defined relative to the intercolumnar overlap area. For example, if a two-layer intercolumnar overlap area where the light shielding column is overlapped by the first color filter column or the second color filter column is defined as shown in FIGS. 6 and 10A (to be mentioned later), then the intercolumnar non-overlap area will include areas that are lower in height than the two-layer structure (i.e., the areas where each of the first and second color filter columns and the light shielding column is provided by itself and the area where none of these columns is present). Meanwhile, if a three-layer intercolumnar overlap area where the light shielding column is overlapped by both of the first and second color filter columns is defined as shown in FIG. 10B (to be mentioned later), then the intercolumnar non-overlap area will include areas that are lower in height than the three-layer structure (i.e., the areas where each of the first and second color filter columns and the light shielding column is provided by itself, the area where the first and second color filter columns overlap each other, and the area where none of these columns is present).

Also, if the "intercolumnar non-overlap area is defined so as to extend continuously in the row direction", then the intercolumnar non-overlap area with such a configuration is provided in the intercolumnar area without a break (i.e., continuously in the row direction).

At least one intercolumnar non-overlap area like this needs to be provided for each light shielding column. This is because by providing at least one non-overlap area, a path for letting the liquid crystal material dropped flow through the pixel column smoothly can be opened up. That is why there is no need to provide three openings for each pixel by joining the recesses on the first and second sides of the light shielding column together as is done in the preferred embodiment illustrated in FIG. 2. And the effects of the present invention can also be achieved even if the opening is provided for every predetermined number of pixels (e.g., one opening for every ten pixels). Nevertheless, to make the liquid crystal material flow as smoothly as possible, at least one opening is preferably provided for each pixel.

The recesses to be provided for each light shielding column may have any arbitrary shape, which may be a triangular, trapezoidal, rectangular or any other polygonal shape.

The width and the number of recesses to be provided for the light shielding column are not particularly limited as long as the light shielding column can shield active components such as TFTs from light and can hide electrically connecting portions with abnormal orientations. Preferably, a largest possible number of recesses with a largest possible width are provided as long as the number or the width does not exceed its permissible range. More specifically, one to three recesses are preferably provided for each light shielding column so as to have a width of 3 µm to 10 µm, although the preferred number and width of the recesses change with the permissible range of parasitic capacitance produced between the conductive portion of a data line and a pixel electrode or the precision of patterning.

Hereinafter, a color filter substrate according to this preferred embodiment and an LCD according to this preferred embodiment, including that color filter substrate, will be described with reference to FIGS. 2 through 5. After that, the relationship between the intercolumnar overlap area and the intercolumnar non-overlap area according to this preferred embodiment will be described in detail with reference to FIG. 2 and FIGS. 6 through 10.

Figure 4:
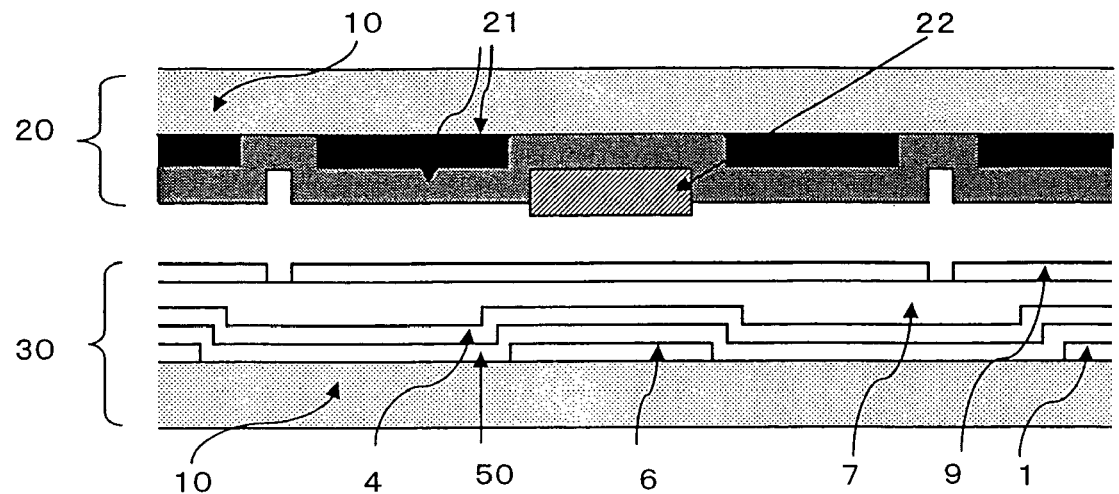
FIG. 4 is a cross-sectional view of the LCD shown in FIG. 3A as viewed on the plane IV-IV.
Figure 5:
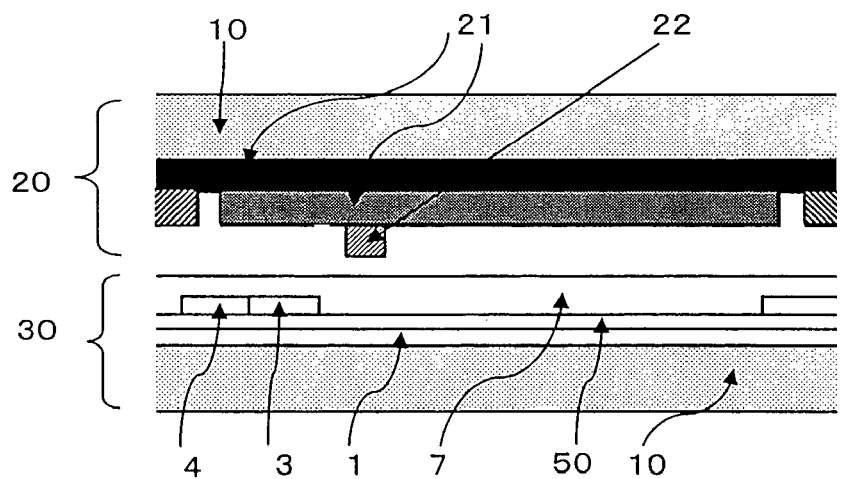
FIG. 5 is a cross-sectional view of the LCD shown in FIG. 3A as viewed on the plane V-V.

FIG. 2 is a plan view illustrating a color filter substrate according to the first specific preferred embodiment of the present invention. When viewed on the plane I-I (in the intercolumnar overlap area) shown in FIG. 2, the color filter substrate will have the same cross section as the counterpart shown in FIG. 1. The illustration of other members. (e.g., orientation-controlling protrusions on the counter electrode) of the color filter substrate is omitted in FIG. 2. FIG. 3A is a plan view illustrating a pixel of an LCD fabricated on the color filter substrate of this preferred embodiment. FIG. 3B is a plan view illustrating the location of the slit pattern of transparent pixel electrodes on the active-matrix substrate with respect to the light shielding layer. And FIG. 3C illustrates a source line 4 on a larger scale. FIGS. 4 and 5 are cross-sectional views of the LCD shown in FIG. 3A as respectively viewed on the plane IV-IV (in an intercolumnar area) and on the plane V-V (in an interrow area) shown in FIG. 3A.

As shown in FIG. 2, each of the first color filter column 60, the light shielding column 70 and the second color filter column 80 preferably has a first side and a second side that define its width in the row direction. Specifically, the first color filter column 60 preferably has a first side 61 and a second side 62 that define its width in the row direction. The second color filter column 80 preferably has a first side 81 and a second side 82 that define its width in the row direction. And the light shielding column 70 preferably has a first side 71 and a second side 72 that define its width in the row direction. If the direction, which is pointed from the first side of these columns toward the second side thereof and parallel to the row direction, is called +x direction, the first color filter column 60, the light shielding column 70 and the second color filter column 80 are preferably arranged in this order in the +x direction.

The light shielding column 70 is preferably provided so as to face a conductive portion 110 (see FIGS. 3A and 3C). The intercolumnar area associated with a pixel (not shown) preferably has three openings 73 in total (as pointed by the arrows in FIG. 3A) that face the conductive portion 110 (see FIGS. 3A and 3C), a storage capacitor line 2 parallel to a gate line 1 and the source line 4. The non-overlap area defined by each of these openings 73 consists of a portion where only the first color filter column is present, a portion where none of the first and second color filter columns and the light shielding column is present, and a portion where only the second color filter column is present from left to right in FIG. 2. As can be seen, the area defined by joining the non-overlap areas, where the light shielding column is overlapped by neither the first color filter column nor the second color filter column, through the intercolumnar area in the row direction (i.e., the opening 73) can be a path to let the liquid crystal material dropped flow through the liquid crystal cell smoothly, thus preventing the production of residual bubbles effectively.

More specifically, the relationship between the intercolumnar overlap area and the intercolumnar non-overlap area according to this preferred embodiment is preferably defined as shown in FIG. 6. Portion (a) of FIG. 6 is a partial enlarged view of the color filter substrate shown in FIG. 2. Portion (b) of FIG. 6 is a cross-sectional view of the color filter substrate as viewed on the plane VIb-VIb shown in portion (a) of FIG. 6, while portion (c) of FIG. 6 is a cross-sectional view of the dolor filter substrate as viewed on the plane VIc-VIc shown in portion (a) of FIG. 6.

As shown in FIG. 2, the color filter substrate of this preferred embodiment preferably includes the first and second color filter columns 60 and 80, which are respectively provided for two columns of pixels (which will be referred to herein as "pixel columns") that are adjacent to each other in the row direction, and the light shielding column 70, which is provided in the gap between the two adjacent pixel columns.

As shown in portion (a) of FIG. 6, the light shielding column 70 with the opening 73 is preferably provided in an area 120 located in the gap between the two pixel columns (i.e., in the intercolumnar area 120). The opening 73 is preferably formed by joining together a first-side recess (not shown), which recedes from the first side 71 of the light shielding column 70 toward the second side 72 thereof, and a second-side recess (not shown), which recedes from the second side 72 of the light shielding column 70 toward the first side 71 thereof.

In a portion of the intercolumnar area 120 as viewed on the plane VIb-VIb shown in portion (a) of FIG. 6, an overlap area 121 where the first color filter column 60 overlaps the light shielding column 70, an overlap area 123 where the second color filter column 80 overlaps the light shielding column 70, and a non-overlap area 122 where only the light shielding column 70 is present are defined as shown in portion (b) of FIG. 6. On the other hand, in another portion of the intercolumnar area 120 as viewed on the plane VIc-VIc shown in portion (a) of FIG. 6, a non-overlap area 124 where only the first color filter column 60 is present, a non-overlap area 125 where none of the color filter columns and light shielding column is present, and a non-overlap area 126 where only the second color filter column 80 is present are defined so as to extend continuously in the row direction as shown in portion (c) of FIG. 6. In this manner, this preferred embodiment is characterized by arranging the intercolumnar non-overlap area, defined by the light shielding column with at least one recess, continuously in the row direction to make a path that lets the liquid crystal material dropped flow through the liquid crystal cell smoothly.

The first-side and second-side recesses provided on the first and second sides of the light shielding column are preferably arranged so as to face each other. However, the present invention is in no way limited to this specific preferred embodiment. For example, the first-side and second-side recesses may also be arranged obliquely because the intercolumnar non-overlap area can be an effective path for the liquid crystal material as long as the area is continuous in the row direction.

To avoid the color missing (i.e., leakage of light), the intercolumnar non-overlap area is preferably defined so as to face a data signal line (i.e., a source line) on the active-matrix substrate.

In an arrangement including a source line with a redundant structure as in this preferred embodiment, the intercolumnar non-overlap area is preferably provided so as to face the conductive portion 110. The same statement will equally apply to each of the other preferred embodiments to be described later. As shown in detail in FIG. 3C, the source line 4 shown in FIG. 3A preferably includes a plurality of branches 4a and 4b and the conductive portion 110 that connects these branches together. That is to say, the conductive portion 110 realizes a redundant structure in which no defect would be produced even if one of the two source line branches were disconnected. By providing the intercolumnar non-overlap area in front of such a conductive portion 110, not only the color missing but also disconnection can be prevented as well.

In order to prevent misalignment that might occur when an LCD is fabricated by bonding the color filter substrate and the active-matrix substrate together, the recesses of the light shielding column are most preferably provided so as to face the storage capacitor lines 2 (more specifically, so as to face not only the storage capacitor line 2 extending parallel to the gate lines 1 but also the source lines 4). This is because the leakage of light and color missing due to the misalignment in the row direction can be prevented by the storage capacitor lines 2. The same statement will equally apply to each of the preferred embodiments to be described later.

This point will be described more fully with reference to FIG. 27. FIG. 27 is a cross-sectional view as viewed on the plane XXVII-XXVII shown in FIG. 3A to illustrate a situation where misalignment has occurred in the row direction while the LCD shown in FIG. 3A is fabricated on the color filter substrate of this preferred embodiment.

If misalignment has occurred in the row direction (i.e., along the gate line or storage capacitor line) as shown in FIG. 27 while the color filter substrate including an light shielding column with an opening such as that shown in portion (a) of FIG. 6 and the active-matrix substrate 30 are being bonded together, then the openings X of the light shielding column, provided so as to face the source line 4, will be located inside of pixels to cause leakage of light. Or the color filter column 21 will not be aligned with the transparent pixel electrodes 9 to produce color missing and deteriorate the display quality. If the degree of misalignment further increased, then color mixture would occur between adjacent color filter columns to further deteriorate the display quality. To effectively avoid these inconveniences caused by the misalignment, the intercolumnar non-overlap area (i.e., the light shielding column with openings) may be defined so as to face the storage capacitor line.

Hereinafter, a conventional color filter substrate will be described for the purpose of comparison with reference to FIGS. 7A through 9. FIG. 7A is a plan view illustrating a pixel of an LCD fabricated on a conventional color filter substrate. FIG. 7B is a plan view illustrating the locations of transparent pixel electrodes on the active-matrix substrate with respect to the light shielding column. FIGS. 8 and 9 are cross-sectional views of the LCD shown in FIG. 7A as respectively viewed on the plane VIII-VIII (in an intercolumnar area) and on the plane IX-IX (in an interrow area) shown in FIG. 7A.

As is clear from these drawings, the conventional color filter substrate has openings with a closed cross section and no light shielding column located in an intercolumnar area has any recesses at all. In the same way, no light shielding row located in an interrow area has any recesses at all, either. That is to say, the conventional color filter substrate has a cross section such as that shown in portion (b) of FIG. 6, no matter whether the cross section is taken in an intercolumnar area or in an interrow area. In other words, no intercolumnar non-overlap area, in which the light shielding column is overlapped by neither the first color filter column nor the second color filter column, extends continuously through any intercolumnar area in the row direction. As a result, the flow of the liquid crystal material injected is obstructed to produce bubbles easily.

In the preferred embodiment described above, an opening is formed by joining a first-side recess on the first side of an light shielding column and a second-side recess on the second side thereof together. However, the "intercolumnar non-overlap area where an light shielding column with at least one recess is provided such that the intercolumnar non-overlap area extends continuously in the row direction" is not limited to this specific preferred embodiment. Modified examples of this preferred embodiment are illustrated in FIGS. 10A and 10B.

One of these two modified examples is shown in FIG. 10A, which illustrates a color filter substrate where the first-side and second-side recesses are not joined together (i.e., do not form any opening). Portion (a) of FIG. 10A is a plan view illustrating a positional relationship between a first-side recess 76 on the first side 71 of such an light shielding column 70 and a second-side recess 77 on the second side 72 thereof in such a color filter substrate with no openings. Portion (b) of FIG. 10A is a cross-sectional view of the color filter substrate as viewed on the plane XAb-XAb shown in portion (a) of FIG. 10A. And portion (c) of FIG. 10A is a cross-sectional view of the color filter substrate as viewed on the plane XAc-XAc shown in portion (a) of FIG. 10A.

Among these drawings, the cross section shown in portion (b) of FIG. 10A is identical with that shown in portion (b) of FIG. 6. As viewed on the plane XAb-XAb, in a portion of the intercolumnar area 120 shown in portion (a) of FIG. 10A, an overlap area 121 where the first color filter column 60 overlaps the light shielding column 70, an overlap area 123 where the second color filter column 80 overlaps the light shielding column 70, and a non-overlap area 122 where only the light shielding column 70 is present are defined as shown in portion (b) of FIG. 10A. On the other hand, in another portion of the intercolumnar area 120 as viewed on the plane XAc-XAc shown in portion (a) of FIG. 10A, a non-overlap area 124 where only the first color filter column 60 is present, a non-overlap area 125 where none of the color filter columns and light shielding column is present, a non-overlap area 122 where only the light shielding column 70 is present, another non-overlap area 125 where none of the color filter columns and light shielding column is present, and a non-overlap area 126 where only the second color filter column 80 is present are arranged continuously in the row direction as shown in portion (c) of FIG. 10A. Such a non-overlap area can also make a path that lets the liquid crystal material dropped flow through the liquid crystal cell smoothly, thus preventing residual bubbles from being produced.

On the other hand, FIG. 10B illustrates a color filter substrate in which a "three-layer overlap area" where the light shielding column, first color filter column and second color filter column overlap each other is defined, and in which the intercolumnar non-overlap area consists of an area where only the first color filter column is present, an area where the first and second color filter columns overlap each other, and an area where only the second color filter column is present. In this preferred embodiment, the "intercolumnar overlap area in which the light shielding column and at least one of the first and second color filter columns overlap each other" includes an area in which the light shielding column and the first color filter column overlap each other and an area in which the light shielding column and the second color filter column overlap each other. However, the "intercolumnar overlap area" does not always refer to such an area where the light shielding column and one of the first and second color filter columns overlap each other but also includes an area where the light shielding column and both of the first and second color filter columns overlap each other (i.e., an overlap area consisting of three layers). And the color filter substrate shown in FIG. 10B includes such a three-layer overlap area.

Portion (a) of FIG. 10B illustrates a color filter substrate with such a three-layer overlap area. Portion (b) of FIG. 10B is a cross-sectional view of the color filter substrate as viewed on the plane XBb-XBb shown in portion (a) of FIG. 10B. And portion (c) of FIG. 10B is a cross-sectional view of the color filter substrate as viewed on the plane XBc-XBc shown in portion (a) of FIG. 10B.

As shown in portion (a) of FIG. 10B, not only an light shielding column 70 with an opening 73 but also first and second color filter columns 60 and 80, overlapping the light shielding column 70, are arranged in the intercolumnar area 120. The opening 73 is defined by joining together a first-side recess (not shown), which recedes from the first side 71 of the light shielding column 70 toward the second side 72 thereof, and a second-side recess (not shown, either), which recedes from the second side 72 of the light shielding column 70 toward the first side 71 thereof.

As viewed on the plane XBb-XBb, in a portion of the intercolumnar area 120 shown in portion (a) of FIG. 10B, an overlap area 121 where the first color filter column 60 overlaps the light shielding column 70, an overlap area 123 where the second color filter column 80 overlaps the light shielding column 70, and an overlap area 127 where all of the first and second color filter columns 60 and 80 and the light shielding column 70 overlap each other are defined as shown in portion (b) of FIG. 10B. On the other hand, in another portion of the intercolumnar area 120 as viewed on the plane XBc-XBc shown in portion (a) of FIG. 10B, a non-overlap area 124 where only the first color filter column 60 is present, a non-overlap area 128 where the first and second color filter columns 60 and 80 overlap each other, and a non-overlap area 126 where only the second color filter column 80 is present are arranged continuously in the row direction as shown in portion (c) of FIG. 10B. Such a non-overlap area can also make a path that lets the liquid crystal material dropped flow through the liquid crystal cell smoothly, thus preventing residual bubbles from being produced.

In each of the preferred embodiments described above, an light shielding column is provided in every intercolumnar area. And by defining an intercolumnar non-overlap area, where the light shielding column is overlapped by neither the first color filter column nor the second color filter column, continuously in the row direction, a path is made so as to let the liquid crystal material dropped flow through the cell smoothly and the residual bubbles can be eliminated. However, the effects of the present invention are not always achieved by such a color filter substrate with light shielding columns. Rather, even a color filter substrate, including no light shielding columns but just color filter columns in multiple colors (e.g., red color filter columns, green color filter columns and blue color filter columns) can also achieve similar effects as long as an area is defined to make a path that lets the liquid crystal material flow smoothly.

Hereinafter, a preferred embodiment of such a color filter substrate with no light shielding columns will be described with reference to FIG. 10. This preferred embodiment is a color filter substrate including just color filter columns in the three primary colors of red, green and blue. As shown in portions (a) and (c) of FIG. 10C, by providing a recess for the green color filter column such that the red color filter column is overlapped by the blue color filter column, or vice versa, the function of the light shielding column is also realized. The red and blue color filter columns preferably overlap each other as shown in FIG. 10C to enhance the light shielding effects.

Portion (a) of FIG. 10C is a plan view illustrating such a color filter substrate. Portion (b) of FIG. 10C is a cross-sectional view of the color filter substrate as viewed on the plane XCb-XCb shown in portion (a) of FIG. 10C. And portion (c) of FIG. 10C is a cross-sectional view of the color filter substrate as viewed on the plane XCc-XCc shown in portion (a) of FIG. 10C.

As shown in portion (a) of FIG. 10C, not only a green color filter column G with a recess but also red and blue color filter columns R and B, overlapping the green color filter column G, are provided in the intercolumnar area 120.

As viewed on the plane XCb-XCb, in a portion of the intercolumnar area 120 shown in portion (a) of FIG. 10C, an area 162 where the green color filter column G overlaps the red color filter column R, an area 164 where the blue color filter column B overlaps the red color filter column R, and an area 163 where all of the red, green and blue color filter columns R, G and B overlap each other are defined as shown in portion (b) of FIG. 10C. On the other hand, in another portion of the intercolumnar area 120 as viewed on the plane XCc-XCc shown in portion (a) of FIG. 10C, an area 165 where only the red color filter column R is present and an area 164 where the red and blue color filter columns R and B overlap each other are arranged continuously in the row direction as shown in portion (c) of FIG. 10C. These areas 165 and 164 can also function as a sort of "intercolumnar non-overlap area", thus preventing residual bubbles from being produced.

Hereinafter, an LCD to be fabricated on the color filter substrate of this preferred embodiment will be described with reference to FIGS. 3A through 5.

As described above, the LCD of this preferred embodiment preferably includes the active-matrix substrate 30 and color filter substrate 20 opposed to each other and a liquid crystal layer (not shown) interposed between these two substrates (see FIGS. 4 and 5).

The active-matrix substrate 30 preferably includes scan signal lines (i.e., gate lines) 1 and data signal lines (i.e., source lines) 4, which are arranged on an insulating transparent substrate 10 so as to intersect with each other with a gate insulating film 50 interposed between them, and also includes active components 3 such as TFTs arranged near their intersections. Each of the source lines 4 preferably includes a plurality of branches 4a and 4b and a conductive portion 110 that connects these branches together as shown in FIG. 3C.

As shown in detail in FIG. 3A, the active-matrix substrate 30 preferably includes the scan signal lines (gate lines) 1, storage capacitor lines 2 provided substantially parallel to the gate lines 1, storage capacitor electrodes 6 for stabilizing the potential at pixel electrodes 9, drain extensions 5 connected to active components 3 such as TFTs, and the pixel electrodes 9 connected to the drain extensions 5 by way of contact holes 8 cut through an interlayer dielectric film 7. Each of the pixel electrodes 9 preferably includes a plurality of slits 11, which will be referred to herein as "pixel electrode slits".

As described above, in the electrically connecting portions 12a, 12b, 12c, 12d, 12e and 12f located around the shorter side of each slit 11 (i.e., the side intersecting with the longer sides thereof), liquid crystal molecules easily have their orientations disturbed to produce abnormal orientations. That is why to cover those portions with abnormal orientations, the electrically connecting portions 12a through 12d are preferably arranged so as to overlap the light shielding layer 140, while the other electrically connecting portions 12e and 12f are preferably arranged so as to overlap the storage capacitor line 2 as shown in FIG. 3A. Then, deterioration in display quality due to the abnormal orientations produced in these electrically connecting portions 12a through 12f can be minimized. For that purpose, in this preferred embodiment, the openings of an light shielding column to define the intercolumnar non-overlap areas are provided so as not to overlap with any of these electrically connecting portions (i.e., as pointed by the arrows in FIG. 3A).

Embodiment 2

A second specific preferred embodiment of the present invention is a color filter substrate where in a gap between two pixels that are adjacent in a row direction, an intercolumnar overlap area, in which the light shielding column and at least one of the first and second color filter columns overlap each other, and an intercolumnar non-overlap area, in which the light shielding column is overlapped by neither the first color filter column nor the second color filter column, are defined, and where the first and second color filter columns, each including at least one recess, are provided for the intercolumnar non-overlap area such that the recesses extend continuously in the row direction. More specifically, the color filter substrate of this preferred embodiment has an intercolumnar non-overlap area with a first-side recess, which recedes from the first side of the second color filter column toward the second side thereof, and a second-side recess, which recedes from the second side of the first color filter column toward the first side thereof.

As in the first preferred embodiment described above, an intercolumnar non-overlap area to make a path for the liquid crystal material dropped is also provided in an intercolumnar area according to this preferred embodiment. However, unlike the first preferred embodiment in which an light shielding column with at least one recess is provided in the intercolumnar non-overlap area, the first and second color filter columns, each including at least one recess, are provided in the intercolumnar non-overlap area of this preferred embodiment.

At least one intercolumnar non-overlap area like this needs to be provided for each pair of color filter columns. This is because by providing at least one non-overlap area, a path for letting the liquid crystal material dropped flow through the pixel column smoothly can be opened up. That is why there is no need to provide three recesses for each pixel as is done in this preferred embodiment. Instead, the recesses may be provided for every predetermined number of pixels (e.g., three recesses for every ten pixels). Nevertheless, to make the liquid crystal material flow as smoothly as possible, at least one recess is preferably provided for each pixel.

The recesses to be provided for each color filter portion may have any arbitrary shape, which may be a triangular, trapezoidal, rectangular or any other polygonal shape.

The width and the number of recesses to be provided for each color filter portion are not particularly limited as long as the color filter columns can shield active components such as TFTs from light and can hide electrically connecting portions with abnormal orientations. Preferably, a largest possible number of recesses with a largest possible width are provided as long as the number or the width does not exceed its permissible range. More specifically, one to three recesses are preferably provided for each color filter portion so as to have a width of 3 μm to 10 μm, although the preferred number and width of the recesses change with the permissible range of parasitic capacitance produced between the conductive portion of a data line and a pixel electrode or the precision of patterning.

Hereinafter, a color filter substrate according to this preferred embodiment and an LCD according to this preferred embodiment, including that color filter substrate, will be described with reference to FIGS. 11 through 14. After that, the relationship between the intercolumnar overlap area and the intercolumnar non-overlap area according to this preferred embodiment will be described in detail with reference to FIGS. 11 and 15.

FIG. 11 is a plan view illustrating a color filter substrate according to the second specific preferred embodiment of the present invention. The illustration of other members (e.g., orientation-controlling protrusions on the counter electrode) of the color filter substrate is omitted in FIG. 11. FIG. 12 is a plan view illustrating a pixel of an LCD fabricated on the color filter substrate of this preferred embodiment. Only a plan view of the pixel electrode pattern is illustrated in FIG. 12 and other members of the active-matrix substrate (such as source lines, storage capacitor lines and gate lines) are not illustrated there for convenience sake. FIGS. 13 and 14 are cross-sectional views of the LCD shown in FIG. 12 as respectively viewed on the plane XIII-XIII (in an interrow area) and on the plane XIV-XIV (in an intercolumnar area) shown in FIG. 12.

Unlike the color filter column of the first preferred embodiment, implemented as a single continuous strip of color filters, each color filter column of this preferred embodiment is provided as a set of color filter portions, which are separately arranged for respective pixels. The arrangement of the color filter column is not limited to this preferred embodiment but the arrangement of the first preferred embodiment may be adopted, too.

As shown in FIG. 11, a first color filter portion 65 belonging to the first color filter column 60 and a second color filter portion 85 belonging to the second color filter column 80 are preferably arranged in this preferred embodiment so as to face a pixel electrode. The first side 81 of the second color filter portion 85 preferably includes three first-side recesses 89, which recede from the first side 81 of the second color filter portion 85 toward the second side 82 thereof. On the other hand, the second side 62 of the first color filter portion 65 preferably includes three second-side recesses 69, which recede from the second side 62 of the first color filter portion 65 toward the first side 61 thereof. The first-side recesses 89 of the second color filter portion 85 are preferably provided so as to face the second-side recesses 69 of the first color filter portion 65 by way of the light shielding column 70.

The three second-side recesses 69 of the first color filter portion 65 and the three first-side recesses 89 of the second color filter portion 85 are preferably all provided so as to face a source line (not shown). Two of the three second-side recesses 69 and two of the three first-side recesses 89 are preferably opposed to a conductive portion 110 (not shown), while the other second-side recess 69 and the other first-side recess 89 are preferably opposed to both a storage capacitor line (not shown), parallel to a gate line (not shown), and the source line (not shown). The non-overlap area, defined by these second-side recesses 69 and these first-side recesses 89, preferably consists of an light shielding column alone. In this preferred embodiment, the non-overlap area, consisting of only the light shielding column, extends continuously in the row direction through the intercolumnar area. As a result, a path is made to let the liquid crystal material dropped flow through the liquid crystal cell smoothly, thus preventing residual bubbles from being produced.

The first-side recesses 89 of the second color filter portion 85 and the second-side recesses 69 of the first color filter portion 65 are preferably arranged so as to face each other as shown in FIG. 11. However, the present invention is in no way limited to this specific preferred embodiment. For example, the first-side and second-side recesses may also be arranged obliquely because the non-overlap area, defined by these recesses, can be an effective path for the liquid crystal material as long as the area is continuous in the row direction.

The preferred location of the intercolumnar non-overlap area is just as already described for the first preferred embodiment. That is to say, to avoid the color missing (i.e., leakage of light), the intercolumnar non-overlap area is preferably defined so as to face a data signal line (i.e., a source line) on the active-matrix substrate. In an arrangement with a source line including a number of branches and a conductive portion that connects these branches together as in this preferred embodiment, the intercolumnar non-overlap area is preferably provided so as to face the conductive portion. If the active-matrix substrate includes a storage capacitor line, then the intercolumnar non-overlap area is preferably defined so as to face the storage capacitor line.

More specifically, the relationship between the intercolumnar overlap area and the intercolumnar non-overlap area according to this preferred embodiment is preferably defined as shown in FIG. 15. Portion (a) of FIG. 15 is a partial enlarged view of the color filter substrate shown in FIG. 11. Portion (b) of FIG. 15 is a cross-sectional view of the color filter substrate as viewed on the plane XVb-XVb shown in portion (a) of FIG. 15, while portion (c) of FIG. 15 is a cross-sectional view of the color filter substrate as viewed on the plane XVc-XVc shown in portion (a) of FIG. 15.

As shown in portion (a) of FIG. 15, in an area 120 located in the gap between the two pixel columns (i.e., in the intercolumnar area 120), provided are a first-side recess 89 of the second color filter column and a second-side recess 69 of the first color filter column.

As viewed on the plane XVb-XVb, in a portion of the intercolumnar area 120 shown in portion (a) of FIG. 15, an overlap area 121 where the first color filter column 60 overlaps the light shielding column 70, an overlap area 123 where the second color filter column 80 overlaps the light shielding column 70, and a non-overlap area 122 where only the light shielding column 70 is present are defined as shown in portion (b) of FIG. 15. This cross section is the same as that shown in portion (a) of FIG. 6. On the other hand, in another portion of the intercolumnar area 120 as viewed on the plane XVc-XVc shown in portion (a) of FIG. 15, the non-overlap area 122 where only the light shielding column 70 is present is defined so as to extend continuously in the row direction as shown in portion (c) of FIG. 15. In this manner, this preferred embodiment is characterized by arranging the intercolumnar non-overlap area, defined by the first and second color filters portions each having at least one recess, continuously in the row direction to make a path that lets the liquid crystal material dropped flow through the liquid crystal cell smoothly. It should be noted that the first and second color filter portions may also be provided as first and second color filter columns. The same statement will apply to the rest of the description of this preferred embodiment.

Optionally, according to this preferred embodiment, an light shielding column including at least one recess as already described for the first preferred embodiment, as well as the first and second color filter columns (or color filter portions) each having at least one recess, may be provided for the intercolumnar non-overlap area of a color filter substrate. By providing the recesses for both the light shielding column and the color filter columns, additional paths are opened up to let the liquid crystal material dropped flow more smoothly, thus preventing the production of residual bubbles even more effectively.

Among other things, a color filter substrate, in which no light shielding columns or color filter columns are present in the intercolumnar non-overlap area, is particularly preferred because a broader path for the liquid crystal material is opened up.

Portion (a) of FIG. 16 is a plan view illustrating a color filter substrate according to such an alternative preferred embodiment. Portion (b) of FIG. 16 is a cross-sectional view of the color filter substrate as viewed on the plane XVIb-XVIb shown in portion (a) of FIG. 16. And portion (c) of FIG. 16 is a cross-sectional view of the color filter substrate as viewed on the plane XVIc-XVIc shown in portion (a) of FIG. 16.

As shown in portion (a) of FIG. 16, a first color filter column 60 with a second-side recess 69 on its second side 62, an light shielding column 70 with an opening, and a second color filter column 80 with a first-side recess 89 on its first side 81 are preferably provided in the intercolumnar area 120.

The cross section shown in portion (b) of FIG. 16 is the same as that shown in portion (b) of FIG. 6. Specifically, in a portion of the intercolumnar area 120 as viewed on the plane XVIb-XVIb shown in portion (a) of FIG. 16, an overlap area 121 where the first color filter column 60 overlaps the light shielding column 70, an overlap area 123 where the second color filter column 80 overlaps the light shielding column 70, and a non-overlap area 122 where only the light shielding column 70 is present are defined as shown in portion (b) of FIG. 16.

Meanwhile, in another portion of the intercolumnar area 120 as viewed on the plane XVIc-XVIc shown in portion (a) of FIG. 16, a non-overlap area 125, where no light shielding column or color filter columns are present, extends continuously in the row direction as shown in portion (c) of FIG. 16.

This color filter substrate is obtained by combining the color filter substrate of the first preferred embodiment, including the light shielding column shown in FIG. 6, with the counterpart of this preferred embodiment, including the first and second color filter columns shown in FIG. 15. The opening of the light shielding column 70 and the recesses of the first and second color filter columns 60 and 80 are defined so as to have the same width in the column direction. As a result, an opening 78, where no light shielding columns or color filter columns are present, is formed in the intercolumnar non-overlap area.

Embodiment 3

A third specific preferred embodiment of the present invention is a color filter substrate where in a gap between two pixels that are adjacent in a column direction, an interrow overlap area, in which an light shielding row and at least one of first and second color filter columns overlap each other, and an interrow non-overlap area, in which the light shielding row is overlapped by neither the first color filter column nor the second color filter column, are defined, and where the light shielding row, including at least one recess, is provided in the interrow non-overlap area such that the interrow non-overlap area extends continuously in the column direction. Specifically, a third-side recess on the third side of the light shielding row and a fourth-side recess on the fourth side thereof are joined together to form an opening extending in the column direction in the interrow non-overlap area.

As used herein, the "interrow overlap area in which the light shielding row and at least one of the first and second color filter columns overlap each other" includes an area in which the light shielding row and the first color filter column overlap each other and an area in which the light shielding row and the second color filter column overlap each other. However, the "interrow overlap area" does not always refer to such an area where the light shielding row and one of the first and second color filter columns overlap each other but also includes an area where the light shielding row and both of the first and second color filter columns overlap each other (i.e., an overlap area consisting of three layers).

On the other hand, the "interrow non-overlap area" refers to an area in which the light shielding row is overlapped by neither the first color filter column nor the second color filter column and which includes an area where the first color filter portion is provided by itself, an area where the second color filter portion is provided by itself, an area where the light shielding row is provided by itself, an area where the first and second color filter portions overlap each other, and an area where none of these portions and row is present.

More specifically, the interrow non-overlap area is defined relative to the interrow overlap area. For example, if a two-layer interrow overlap area where the light shielding row is overlapped by the first color filter portion or the second color filter portion is defined as shown in FIG. 18 (to be mentioned later), then the interrow non-overlap area will include areas that are lower in height than the two-layer structure (i.e., the areas where each of the first and second color filter portions and the light shielding row is provided by itself and the area where none of these portions and row is present). Meanwhile, if a three-layer interrow overlap area where the light shielding row is overlapped by both of the first and second color filter portions is defined, then the interrow non-overlap area will include areas that are lower in height than the three-layer structure (i.e., the areas where each of the first and second color filter portions and the light shielding row is provided by itself, the area where the first and second color filter portions overlap each other, and the area where none of these portions and row is present).

Also, if the "interrow non-overlap area is defined so as to extend continuously in the column direction", then the interrow non-overlap area with such a configuration is provided in the interrow area without a break (i.e., continuously in the column direction).

At least one interrow non-overlap area like this needs to be provided for each light shielding row. This is because by providing at least one non-overlap area, a path for letting the liquid crystal material dropped flow through the pixel row smoothly can be opened up. That is why there is no need to provide openings for each pixel by joining the recesses on the third and fourth sides of the light shielding row together as is done in this preferred embodiment. And the effects of the present invention can also be achieved even if the opening is provided for every predetermined number of pixels (e.g., one opening for every ten pixels). Nevertheless, to make the liquid crystal material flow as smoothly as possible, at least one opening is preferably provided for each pixel.

The recesses to be provided for each light shielding row may have any arbitrary shape, which may be a triangular, trapezoidal, rectangular or any other polygonal shape.

The width and the number of recesses to be provided for the light shielding row are not particularly limited as long as the light shielding row can shield active components such as TFTs from light and can hide electrically connecting portions with abnormal orientations. Preferably, a largest possible number of recesses with a largest possible width are provided as long as the number or the width does not exceed its permissible range. More specifically, one to three recesses are preferably provided for each light shielding row so as to have a width of 3 µm to 10 µm, although the preferred number and width of the recesses change with the arrangement of the electrically connecting portions of the transparent pixel electrodes made of ITO, for example.

The third-side and fourth-side recesses provided on the third and fourth sides of the light shielding row are preferably arranged so as to face each other. However, the present invention is in no way limited to this specific preferred embodiment. For example, the third-side and fourth-side recesses may also be arranged obliquely because the interrow non-overlap area can be an effective path for the liquid crystal material as long as the area is continuous in the column direction.

Hereinafter, a color filter substrate according to this preferred embodiment and an LCD according to this preferred embodiment, including that color filter substrate, will be described with reference to FIGS. 17, 18A and 18B. The illustration of other members (e.g., orientation-controlling protrusions on the counter electrode) of the color filter substrate is omitted in FIG. 17. After that, the relationship between the interrow overlap area and the interrow non-overlap area according to this preferred embodiment will be described in detail with reference to FIGS. 17 and 19.

FIG. 17 is a plan view illustrating a color filter substrate according to a third specific preferred embodiment of the present invention. FIG. 18A is a plan view illustrating a pixel of an LCD fabricated on the color filter substrate of the third preferred embodiment. And FIG. 18B is a plan view illustrating the location of the slit pattern of transparent pixel electrodes on the active-matrix substrate with respect to the light shielding layer.

As shown in FIG. 17, each of the first color filter portion 65 belonging to the first color filter column 60, the light shielding row 90 and the second color filter portion 68 also belonging to the first color filter column 60 preferably has a third side and a fourth side that define its width in the column direction. Specifically, the first color filter portion 65 preferably has a third side 63 and a fourth side 64 that define its width in the column direction. The second color filter portion 68 preferably has a third side 66 and a fourth side 67 that define its width in the column direction. And the light shielding row 90 preferably has a third side 93 and a fourth side 94 that define its width in the column direction. If the direction, which is pointed from the third side of these portions and row toward the fourth side thereof and parallel to the column direction, is called +y direction, the first color filter portion 65, the light shielding row 90 and the second color filter portion 68 are preferably arranged in this order in the +y direction.

The light shielding row 90 is preferably provided so as to face a scan signal line (gate line) 1 (see FIG. 18A) and preferably has two openings 96 (as pointed by the arrows in FIG. 18A) in the interrow area associated with a pixel (not shown). The non-overlap area defined by each of these openings 96 consists of a portion 124 where only the first color filter portion 65 is present, a portion 125 where none of the first and second color filter portions 65 and 68 and the light shielding row 90 is present, and a portion 126 where only the second color filter portion 68 is present as shown in detail in portion (c) of FIG. 19. As can be seen, the area defined by joining the non-overlap areas, where the light shielding row is overlapped by neither the first color filter portion nor the second color filter portion, through the interrow area in the column direction (i.e., the opening 96) can be a path to let the liquid crystal material dropped flow through the liquid crystal cell smoothly, thus preventing the production of residual bubbles effectively.

More specifically, the relationship between the interrow overlap area and the interrow non-overlap area according to this preferred embodiment is preferably defined as shown in FIG. 19. Portion (a) of FIG. 19 is a plan view illustrating a color filter substrate according to this preferred embodiment. Portion (b) of FIG. 19 is a cross-sectional view of the color filter substrate as viewed on the plane XIXb-XIXb shown in portion (a) of FIG. 19, while portion (c) of FIG. 19 is a cross-sectional view of the color filter substrate as viewed on the plane XIXc-XIXc shown in portion (a) of FIG. 19.

As shown in portion (a) of FIG. 19, the light shielding row 90 with the opening 96 is preferably provided in an area 130 located in the gap between two pixel rows (i.e., in the interrow area 130). The opening 96 is preferably formed by joining together a third-side recess (not shown), which recedes from the third side 93 of the light shielding row 90 toward the fourth side 94 thereof, and a fourth-side recess (not shown), which recedes from the fourth side 94 of the light shielding row 90 toward the third side 93 thereof.

In a portion of the interrow area 130 as viewed on the plane XIXb-XIXb shown in portion (a) of FIG. 19, an overlap area 121 where the first color filter portion 65 overlaps the light shielding row 90, an overlap area 123 where the second color filter portion 68 overlaps the light shielding row 90, and a non-overlap area 122 where only the light shielding row 90 is present are defined as shown in portion (b) of FIG. 19. On the other hand, in another portion of the interrow area 130 as viewed on the plane XIXc-XIXc shown in portion (a) of FIG. 19, a non-overlap area 124 where only the first color filter portion 65 is present, a non-overlap area 125 where none of the color filter portions and light shielding row 90 is present, and a non-overlap area 126 where only the second color filter portion 68 is present are defined so as to extend continuously in the column direction as shown in portion (c) of FIG. 19. In this manner, this preferred embodiment is characterized by arranging the interrow non-overlap area, defined by the light shielding row with at least one recess, continuously in the column direction.

In the preferred embodiment described above, an opening is formed by joining together the third-side and fourth-side recesses on the light shielding row. However, the present invention is in no way limited to this specific preferred embodiment. Optionally, the third-side and fourth-side recesses may not be joined together (i.e., may not form any opening).

To avoid the color missing (i.e., leakage of light), the recess of the light shielding row is preferably provided so as to face the scan signal line (i.e., a gate line) 1 on the active-matrix substrate. Considering its relative position to the electrically connecting portions 12a through 12d, the recess of the light shielding row is more preferably located at the position shown in FIG. 18A so as to face the gate line 1. This is because in order to hide the abnormal orientations produced at the electrically connecting portions 12a through 12d, the electrically connecting portions 12a through 12d are preferably arranged so as to overlap with the light shielding layer 140.

The preferred embodiment just described may also be modified such that the first and second color filter portions, each including at least one recess, are provided for the interrow non-overlap area so as to extend continuously along a pixel column. Even so, an effective path for the liquid crystal material dropped can also be opened up and the production of residual bubbles can be prevented. More specifically, a color filter substrate according to such an alternative preferred embodiment may have an interrow non-overlap area that is defined by a third-side recess, which recedes from the third side of the second color filter portion toward the fourth side thereof in the column direction, and a fourth-side recess, which recedes from the fourth side of the first color filter portion toward the third side thereof in the column direction.

Optionally, an light shielding row including at least one recess as described for this preferred embodiment, as well as the first and second color filter portions each having at least one recess, may be provided for the interrow non-overlap area of a color filter substrate. By providing the recesses for both the light shielding row and the color filter portions, additional paths are opened up to let the liquid crystal material dropped flow more smoothly, thus preventing the production of residual bubbles even more effectively. Among other things, a color filter substrate, in which no light shielding rows or color filter portions are present in the interrow non-overlap area, is particularly preferred because a broader path is opened up for the liquid crystal material.

Embodiment 4

Fourth and fifth specific preferred embodiments of the present invention are color filter substrates in which an light shielding column with at least one recess or first and second color filter columns, each having at least one recess, are arranged in both the intercolumnar non-overlap area and interrow non-overlap area. By adopting such an arrangement, an even broader path is provided for the liquid crystal material dropped and the production of residual bubbles can be prevented even more effectively.

First, a color filter substrate according to the fourth preferred embodiment preferably has not only an intercolumnar non-overlap area, in which an opening is formed in the row direction by joining together first-side and second-side recesses on the first and second sides of an light shielding column, but also an interrow non-overlap area, in which another opening is formed in the column direction by joining together third-side and fourth-side recesses on the third and fourth sides of an light shielding row.

Hereinafter, an LCD according to this preferred embodiment, fabricated on the color filter substrate of this fourth preferred embodiment, will be described with reference to FIGS. 20 through 22.

FIG. 20 is a plan view illustrating a pixel of an LCD fabricated on the color filter substrate of this fourth preferred embodiment. Only a plan view of the pixel electrode pattern is illustrated in FIG. 20 and other members of the active-matrix substrate (such as source lines, gate lines and conductive portions) are not illustrated there for convenience sake. FIGS. 21 and 22 are cross-sectional views of the LCD shown in FIG. 20 as respectively viewed on the plane XXI-XXI (in an interrow area) and on the plane XXII-XXII (in an intercolumnar area) shown in FIG. 20.

As shown in FIG. 20, the color filter substrate of this preferred embodiment preferably includes an light shielding column with three openings 181, which are arranged so as to face a source line (not shown), in an intercolumnar area and an light shielding row with two openings 182, which are arranged so as to face a gate line (not shown, either), in an interrow area, respectively. Two out of the three openings 181 of the light shielding column are provided so as to face a conductive portion 110 (not shown).

In this preferred embodiment, the relative positions of the intercolumnar overlap area and intercolumnar non-overlap area in the intercolumnar area are defined just as already described for the first preferred embodiment with reference to FIG. 6. Likewise, the relative positions of the interrow overlap area and interrow non-overlap area in the interrow area are defined just as already described for the third preferred embodiment with reference to FIG. 19. Thus, the description thereof will be omitted herein.

In the preferred embodiment illustrated in FIG. 20, three openings are formed by joining together the first-side and second-side recesses of the light shielding column and two openings are formed by joining together the third-side and fourth-side recesses of the light shielding row. However, the present invention is in no way limited to this specific preferred embodiment. Optionally, the first-side and second-side recesses may not be joined together and/or the third-side and fourth-side recesses may not be joined together, either.

Also, in the preferred embodiment illustrated in FIG. 20, the first-side and second-side recesses of the light shielding column are arranged so as to face each other and the third-side and fourth-side recesses of the light shielding row are arranged so as to face each other, too. However, the present invention is in no way limited to this specific arrangement. Those recesses just need to be arranged continuously either in the row direction or in the column direction. For example, the first-side and second-side recesses or the third-side and fourth-side recesses may also be arranged obliquely.

A modified example of the fourth preferred embodiment is shown in FIGS. 23A and 23B. FIG. 23A is a plan view illustrating a pixel of an LCD fabricated on a color filter substrate according to a modified example of the fourth preferred embodiment. FIG. 23B is a plan view illustrating the locations of transparent pixel electrodes with respect to an light shielding column. Unlike the preferred embodiment illustrated in FIG. 20, one out of the three openings in the intercolumnar area is provided in FIGS. 23A and 23B so as to face both a storage capacitor line, parallel to the gate line, and a source line. By positioning the opening that also faces the storage capacitor line in this manner, the misalignment in the row direction as shown in FIG. 27 can be avoided as already described in detail for the first and third preferred embodiments.

Another color filter substrate according to this preferred embodiment may arrange first and second color filter portions, each including at least one recess, in both an intercolumnar non-overlap area and an interrow non-overlap area alike. The first and second color filter portions, provided in the intercolumnar non-overlap area so as to have at least one recess each, have already been described for the second preferred embodiment with reference to FIGS. 11 through 15. And the first and second color filter portions, provided in the interrow non-overlap area so as to have at least one recess each, have already been described for the third preferred embodiment. Thus, the description thereof will be omitted herein.

Embodiment 5

A fifth specific preferred embodiment of the present invention is a color filter substrate in which an light shielding column with at least one recess and a first color filter portion with at least one recess are provided in an intercolumnar non-overlap area and in which an light shielding row with at least one recess is provided in an interrow non-overlap area.

FIG. 24 is a plan view illustrating a pixel of an LCD fabricated on the color filter substrate of this fifth preferred embodiment. Only a plan view of the pixel electrode pattern is illustrated in FIG. 24 and other members of the active-matrix substrate (such as source lines, storage capacitor lines, gate lines and conductive portions) are not illustrated there for convenience sake. FIGS. 25 and 26 are cross-sectional views of the LCD shown in FIG. 24 as respectively viewed on the plane XXV-XXV (in an interrow area) and on the plane XXVI-XXVI (in an intercolumnar area) shown in FIG. 24. As shown in FIG. 25, no color filters are present on the plane XXV-XXV shown in FIG. 24.

As shown in FIG. 24, three openings 181 are provided in an intercolumnar area so as to face a source line (not shown). Each of these openings 181 is defined by overlapping an opening, formed by joining first-side and second-side recesses of the light shielding column together, and a first-side recess of the first color filter portion each other. Two out of the three openings 181 are opposed to the conductive portion 110 (not shown), while the other opening 181 is opposed to a storage capacitor line (not shown), parallel to the gate line (not shown), and the source line (not shown). In an interrow area on the other hand, two openings 182 are provided so as to face the gate line (not shown). Each of these openings 182 is formed by joining together third-side and fourth-side recesses of the light shielding row. By adopting the arrangement shown in FIG. 24, a broader path is provided for the liquid crystal material dropped and the production of residual bubbles can be prevented even more effectively.

For further details, the intercolumnar non-overlap area of this preferred embodiment is just as already described for the first and second preferred embodiments and the interrow non-overlap area is just like that of the third preferred embodiment.

Optionally, according to an alternative preferred embodiment, an opening, in which none of the light shielding column and color filter columns is present, may be provided in both the intercolumnar non-overlap area and interrow non-overlap area. By adopting such an arrangement, the production of residual bubbles can be prevented even more effectively.

Hereinafter, a method for fabricating an LCD according to a preferred embodiment of the present invention will be described.

An active-matrix substrate for use in a preferred embodiment of the present invention may be made as follows.

First, a scan signal line (i.e., gate line) 1 and a storage capacitor line 2 are placed on a transparent insulating substrate 10. These lines may be made at a time by depositing a stack of Ti, Al and Ti films by sputtering or any other known process, defining a resist pattern thereon by a photolithographic process, dry-etching the films with an etching gas such as a chlorine gas, and then stripping the resist pattern. Next, after a gate insulating film of silicon nitride ($SiN_x$), an active semiconductor layer of amorphous silicon, and a low-resistance semiconductor layer of phosphorus-doped amorphous silicon, for example, have been deposited by a CVD process, a data signal line (i.e., a source line) 4, a drain extension 5 and a storage capacitor electrode 6 are formed. These lines and electrodes are made simultaneously by depositing a stack of Al and Ti films by sputtering or any other known process, defining a resist pattern thereon by a photolithographic process, dry-etching the films with an etching gas such as a chlorine gas, and then stripping the resist pattern. A storage capacitor is obtained by interposing a gate insulating film with a thickness of about 400 nm between the storage capacitor line 2 and the storage capacitor electrode 6. Next, to electrically isolate source/drain regions from each other, the low-resistance semiconductor layer is dry-etched with chlorine gas, for example, to complete active components 3 such as TFTs. Thereafter, an interlayer dielectric film 7 of an acrylic photosensitive resin or any other suitable material is applied to a thickness of about 3 μm by a spin-coating technique, and contact holes 8 are opened by a photolithographic process to electrically connect the drain extensions 5 and the transparent pixel electrodes 9 together. After that, the transparent pixel electrodes 9 and alignment film (not shown) are formed in this order.

A display device according to each of the preferred embodiments of the present invention described above is an MVA mode LCD, in which the transparent pixel electrode 9 made of ITO, for example, has a plurality of slits 11. Specifically, a metal film to be a gate electrode is deposited by sputtering or any other known process, a resist pattern is defined thereon by a photolithographic process, and then the metal is etched with an etchant such as ferric chloride, thereby opening the slits 11 such as those illustrated in FIG. 3A. By performing these process steps, an active-matrix substrate for use in a preferred embodiment of the present invention can be obtained.

If the slits 11 are arranged as shown in FIG. 3A, then liquid crystal molecules in the electrically connecting portions 12a through 12f, located around the shorter side of the slits 11 that crosses the longer side thereof, easily have their orientations disturbed to produce abnormal orientations often. Among these electrically connecting portions 12a through 12f, if the electrically connecting portions 12a through 12d are provided over the gate line 1, then display unevenness will produce easily. The reason is as follows. Specifically, although various voltages are applied to a gate line, a positive voltage to turn a TFT ON is usually applied for just several μs, while a negative voltage to turn a TFT OFF is normally applied for as long as a few ms. That is to say, the negative voltage is applied for a much longer time than the positive voltage. That is why if the electrically connecting portions 12a through 12d are provided over the gate line 1, then impurity ions included in the liquid crystal material will be concentrated there due to gate negative DC components. For that reason, when viewed perpendicularly to the principal surface of the substrate, the electrically connecting portions 12a through 12d are preferably arranged so as not to overlap with the gate line 1, and are preferably covered with an light shielding layer.

The abnormal orientations produced in the other electrically connecting portions 12e and 12f can be hidden by arranging these portions 12e and 12f on the storage capacitor line 2. This is because the storage capacitor line 2 has the same potential as the counter electrode on the color filter substrate and because the transparent pixel electrode 9 is alternately supplied with positive and negative potentials with respect to the potential level at the counter electrode every time data is written on a pixel (i.e., the pixel electrode is AC driven). Thus, there is no concern about the concentration of impurity ions in the liquid crystal material toward the storage capacitor line. That is why no light shielding layer needs to be provided over the storage capacitor line. Consequently, the openings can be expanded compared to a conventional one, and an LCD with a high aperture ratio can be obtained.

Japanese Patent Application Laid-Open Publication No. 10-333170 discloses an LCD in which a storage capacitor electrode to produce storage capacitance is provided so as to face the opening of a pixel electrode or a counter electrode in an MVA mode display device, for example, thereby minimizing leakage of light. However, as pointed out in Paragraph No.

0059 of that publication, if the storage capacitor electrode is provided so as to face the opening of the pixel electrode and thereby hide the slits of the pixel electrode entirely, then a "fringe field" (i.e., a tilted electric field for producing pretilt in liquid crystal molecules) created between the pixel electrode and the counter electrode will be affected by the voltage applied to the sustaining electrode. To overcome this problem, Japanese Patent Application Laid-Open Publication No. 10-333170 proposes that an organic insulating film as thick as 3 μm or more be provided as a protective layer between the pixel electrode and the sustaining electrode. However, the capacitance is expressed as the ratio of the electrode area to the thickness. Accordingly, to guarantee sufficient storage capacitance, the area of the electrode to produce the storage capacitance, i.e., the two-dimensional area of a no-slit portion of the pixel electrode overlapping with the sustaining electrode, needs to be increased, thus decreasing the aperture ratio unintentionally. That is why according to this method, the decrease in contrast ratio due to dropped luminance caused by the lower aperture ratio should be more significant than the decrease in contrast ratio due to leakage of light. Consequently, it is difficult to carry out this method practically. Also, even if the arrangement disclosed in that publication is adopted, abnormal orientations are also produced around the ends of the pixel electrode slits to deteriorate the display quality noticeably. Thus, an light shielding layer is also preferably provided to cover those portions.

A color filter substrate according to a preferred embodiment of the present invention may be fabricated in the following manner.

The color filter layers and light shielding layer are typically made of a negative colored resin. For example, the red color filter layer may be made of a negative acrylic photosensitive resin in which a red pigment is dispersed. The resin may be applied onto the substrate by spin coating or any other application technique or by a dry film method.

First, an light shielding layer is formed. Specifically, a black photosensitive resin layer, made of a negative acrylic photosensitive resin in which carbon fine particles are dispersed, is deposited on an insulating transparent substrate. Next, the black photosensitive resin layer is exposed to a radiation through a photomask and then developed, thereby forming an light shielding layer.

For example, in a preferred embodiment in which an light shielding row with at least one recess in an interrow non-overlap area extends continuously in the row direction, the light shielding row is preferably provided so as to face the gate line as already described above, and does not have to be provided to face the storage capacitor line. Specifically, to shield the electrically connecting portions 12a through 12d with abnormal orientations from light as shown in FIG. 3A, the light shielding layer is preferably provided so as to include a plurality of islands. Also, to minimize increase in the amount of off-state leakage current flowing due to optical pumping when active components 3 such as TFTs are exposed to external light, the active components 3 are also preferably covered with an light shielding layer.

Furthermore, in a color filter substrate according to a preferred embodiment of the present invention, if an interlayer dielectric film with a thickness of about 3 μm is provided between a pixel and the gate line, then there is no need to provide any light shielding row that faces the gate line. In the conventional color filter substrate, the light shielding layer needs to be provided so as to face the gate line and be interposed between a pixel and the gate line as shown in FIG. 7A. By providing the interlayer dielectric film, however, a portion of the interlayer dielectric film overlaps the gate line and the capacitance produced between the gate line and the transparent pixel electrode can be reduced sufficiently. As a result, the leakage of light can be prevented. Thus, according to this preferred embodiment, an light shielding column having at least one recess just in an intercolumnar non-overlap area needs to be provided, thus realizing an LCD with a higher aperture ratio than a conventional one.

Next, a red layer is formed. Specifically, a red photosensitive resin layer is made of a negative acrylic photosensitive resin in which a red pigment is dispersed. Thereafter, the red photosensitive resin layer is exposed to a radiation through a photomask and then developed, thereby forming a red layer.

A green layer and a blue layer may be sequentially formed in the same way, thereby obtaining color filter layers.

Thereafter, transparent pixel electrodes 9 of ITO are formed by a sputtering process, for example. Subsequently, orientation-controlling protrusions 22 are formed by patterning a positive phenol novolac photosensitive resin by a photolithographic process. By performing these process steps, the color filter substrate of this preferred embodiment can be obtained.

The light shielding layer and first, second and third color filter layers for use in various preferred embodiments of the present invention may have any appropriate thicknesses. In the LCD of this preferred embodiment, the light shielding layer and color filter layers preferably have a thickness of 1.6 μm and a thickness of 1.8 μm, respectively.

In the preferred embodiments described above, the color filter substrate includes color filters in the three primary colors of red, green and blue. However, the present invention is in no way limited to those specific preferred embodiments. Alternatively, color filters in the four colors of red, green, blue and white may also be used. Optionally, not just those color filters in the three or four colors but also a color filter in at least one of cyan, magenta and yellow may be used in combination. Among other things, the present invention is effectively applicable for use in a color filter substrate including color filters in the six colors of red, green, blue, cyan, magenta, and yellow. By using color filters in these six colors, halftones can be displayed more naturally than a color filter substrate using color filters in just three colors.

Hereinafter, a method for fabricating an LCD panel (or LCD) using the active-matrix substrate and color filter substrate prepared in this manner will be described. As described above, a color filter substrate according to any of the preferred embodiments of the present invention has a structure that can effectively prevent residual bubbles from being produced in the dropping process. Thus, the present invention contributes to manufacturing LCD panels of good display quality without specially modifying the dropping process, which is more advantageous than the injection process in terms of productivity and other factors.

It should be noted that the residual bubbles may sometimes be produced by a gas emitted from a color filter (e.g., adsorbed water), for example. Thus, to prevent the residual bubbles from being produced due to the emission of such gases, a degassing process for removing adsorbed water that has adsorbed to the color filter substrate and active-matrix substrate (TFT substrate) is carried out according to this preferred embodiment before the dropping process is performed. Specifically, the degassing process may be carried out in the following manner.

First, the active-matrix substrate and the color filter substrate are subjected to a baking process at 210° C. for 60 minutes, for example. This is the first degassing process.

Next, after these substrates have been cleaned, the material of an alignment film is deposited on each of these substrates and then subjected to a baking process at 200° C. for 40 minutes, for example, thus obtaining the alignment film.

Thereafter, the resultant alignment film is cleaned and then subjected to a baking process at 200° C. for 30 minutes, for example. This is the second degassing process.

By carrying out the degassing process twice in total in this manner (i.e., once before the alignment film is formed and one more time after the alignment film has been deposited), the unwanted production of residual bubbles due to the adsorbed water can be prevented effectively.

In the manufacturing process disclosed in Japanese Patent Application Laid-Open Publication No. 11-174477 mentioned above, once the alignment film is complete, the liquid crystal material is dropped without subjecting it to any degassing process. In that case, however, degassing may have been done insufficiently. Also, in the manufacturing process disclosed in Japanese Patent Application Laid-Open Publication No. 11-174477, only the color filter substrate is subjected to the degassing process. But if the active-matrix substrate includes an interlayer dielectric film made of a resin material, the emission of gases from that interlayer dielectric film might be non-negligible. That is why the active-matrix substrate is also preferably subjected to the degassing process twice just as described above.

Then, an LCD panel is fabricated by assembling together the color filter substrate and active-matrix substrate obtained in this manner and by adopting the known dropping process. In this case, the interval after the degassing process was carried out for the second time and before the liquid crystal material starts being dropped is preferably managed. This is because if too long a time passed since the second degassing process, then water in the air could adsorb and produce residual bubbles. The present inventors confirmed via experiments that the interval between the end of the degassing process and the start to drop the liquid crystal material was preferably no longer than about 60 minutes at a relative humidity of 60% and an atmosphere temperature of 23° C.

A VGA LCD panel with a screen dimension of 20 inches may be fabricated by the dropping process in the following manner.

First, a seal member made of a UV curable resin is applied onto the edge of the color filter substrate, thereby making a sealing portion. Next, a liquid crystal material is dropped at a constant rate into the area enclosed with the seal member. In this case, supposing the liquid crystal cell has a thickness of 3.7 µm, the liquid crystal material is dropped so as to amount to this thickness.

Specifically, the liquid crystal material is dropped so as to have a weight of 1.317 mg per drop, a total number of drops of 300, and an overall weight of drops of 395.046 mg. Next, the color filter substrate and the active-matrix substrate are assembled together, the pressure inside the assembly is reduced to 1 Pa, and then the two substrates are bonded together under the reduced pressure. Thereafter, when the pressure is raised to the atmospheric pressure, the sealing portion is compressed to decrease the gap at the sealing portion to a desired value. Subsequently, the assembly is exposed to an ultraviolet ray at a curing condition of 2,000 mJ using a UV curing system, thereby curing the sealing portion provisionally. And then the assembly is baked at 130° C. for 70 minutes, thereby curing the sealing portion eventually. The color filter substrate of this preferred embodiment has the structure described above. Thus, the liquid crystal material dropped can expand uniformly all over the area inside of the sealing portion and can fill the gap fully without producing bubbles anywhere. After baked, the assembly is diced into respective LCD panels. The LCD panel of this preferred embodiment is obtained in this manner.

The LCD panel obtained in this manner is connected to a driver circuit if necessary, thereby completing a desired LCD.

In the LCD fabricated in this manner, the liquid crystal material dropped has expanded uniformly all through the liquid crystal cell, thus producing no residual bubbles and showing no sign of deteriorated display quality due to abnormal orientations. As a result, the LCD realizes excellent display quality.

The preferred embodiments of the present invention described above are active-matrix-addressed LCDs including thin-film transistors (TFTs). However, the present invention is in no way limited to those specific preferred embodiments. Alternatively, the present invention is also applicable for use in an active-matrix-addressed LCD including MIMs and a simple-matrix-addressed LCD as well.

A color filter substrate according to every preferred embodiment of the present invention is applicable for use in any of various types of LCDs including transmissive, reflective and transflective (semi-transmissive) ones. Also, the present invention is not limited to any particular color filter arrangement but may be broadly applicable for use in not just the striped arrangement described above but also a delta arrangement as well. Furthermore, the present invention is not limited to any LCD display mode, either, but works fine in TN, MVA, IPS and other display modes. Moreover, the present invention can also be used in any of numerous types of color display devices including a display device with a non-liquid-crystal display medium layer (e.g., an electrophoretic layer), not just in the active-matrix-addressed LCD described above.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 U.S.C. §119(a) on Patent Application No. 2004-217679 filed in Japan on Jul. 26, 2004, the entire contents of which are hereby incorporated by reference.

What is claimed is:

1. A color filter substrate for use in a display device comprising:
   a plurality of pixels arranged in columns and rows to define a matrix pattern;
   a transparent substrate; and
   a number of coloring layers, including a first color filter layer, a second color filter layer, and a light shielding layer made from a photosensitive resin, each of which are provided on the transparent substrate; wherein
   each of the first and second color filter layers include a first color filter column and a second color filter column, where each color filter column corresponds to a column of pixels, and
   the light shielding layer includes a light shielding column that is disposed in a gap between two adjacent columns of pixels along substantially the entire length of the columns of pixels;
   in a gap between two adjacent pixels in a row direction, the light shielding column and at least one of the first and second color filter columns are arranged to define:

an intercolumn overlap area in which the light shielding column and the at least one of the first and second color filter columns overlap each other; and an intercolumn non-overlap area in which a portion of the light shielding column is removed such that neither the first color filter column nor the second color filter column is overlapped by the light shielding column; and the intercolumn non-overlap area extends continuously in the row direction such that in plan view the intercolumn non-overlap area completely overlaps the gap between the two adjacent pixels.

2. The color filter substrate of claim 1, wherein the light shielding column includes at least one recess in the intercolumn non-overlap area.

3. The color filter substrate of claim 2, wherein:

each of the first color filter column, the light shielding column, and the second color filter column has a first side and a second side that define its width in the row direction;

if a direction, which is pointed from the first side of the first color filter column, the light shielding column, or the second color filter column toward the second side thereof and parallel to the row direction, is a +x direction, then the first color filter column, the light shielding column, and the second color filter column are arranged in this order in the +x direction;

the first side of the light shielding column has at least one first-side recess that recedes from the first side of the light shielding column toward the second side thereof in the row direction in the intercolumn non-overlap area; and the second side of the light shielding column has at least one second-side recess that recedes from the second side of the light shielding column toward the first side thereof in the row direction in the intercolumn non-overlap area.

4. The color filter substrate of claim 3, wherein the first-side and second-side recesses of the light shielding column are joined together.

5. The color filter substrate of claim 1, wherein each of the first and second color filter columns has at least one recess in the intercolumn non-overlap area.

6. The color filter substrate of claim 5, wherein:

each of the light shielding column, the first color filter column, and the second color filter column has a first side and a second side that define its width in the row direction;

if a direction, which is pointed from the first side of the first color filter column, the light shielding column, or the second color filter column toward the second side thereof and parallel to the row direction, is a +x direction, then the first color filter column, the light shielding column, and the second color filter column are arranged in this order in the +x direction;

the first side of the second color filter column has at least one first-side recess that recedes from the first side of the second color filter column toward the second side thereof in the row direction in the intercolumn non-overlap area; and the second side of the first color filter column has at least one second-side recess that recedes from the second side of the first color filter column toward the first side thereof in the row direction in the intercolumn non-overlap area.

7. The color filter substrate of claim 6, wherein the first-side recess of the second color filter column is provided so as to face the second-side recess of the first color filter column with the light shielding column interposed between the first and second color filter columns.

8. The color filter substrate of claim 6, wherein each of the light shielding column and the first and second color filter columns has at least one recess in the intercolumn non-overlap area.

9. The color filter substrate of claim 8, wherein:

each of the first color filter column, the light shielding column, and the second color filter column has a first side and a second side that define its width in the row direction;

if a direction, which is pointed from the first side of the first color filter column, the light shielding column, or the second color filter column toward the second side thereof and parallel to the row direction, is a +x direction, then the first color filter column, the light shielding column, and the second color filter column are arranged in this order in the +x direction;

the first side of the light shielding column has at least one first-side recess, which recedes from the first side of the light shielding column toward the second side thereof in the row direction, in the intercolumn non-overlap area;

the second side of the light shielding column has at least one second-side recess, which recedes from the second side of the light shielding column toward the first side thereof in the row direction, in the intercolumn non-overlap area;

the first side of the second color filter column has at least one first-side recess, which recedes from the first side of the second color filter column toward the second side thereof in the row direction, in the intercolumn non-overlap area; and the second side of the first color filter column has at least one second-side recess, which recedes from the second side of the first color filter column toward the first side thereof in the row direction, in the intercolumn non-overlap area.

10. The color filter substrate of claim 9, wherein the first-side and second-side recesses of the light shielding column are joined together.

11. The color filter substrate of claim 10, wherein the first-side recess of the second color filter column and the second-side recess of the first color filter column are joined together by way of the first-side and second-side recesses of the light shielding column.

12. The color filter substrate of claim 1, wherein the intercolumn non-overlap area is arranged so as to face a data signal line on an active-matrix substrate, which is opposed to the color filter substrate with a display medium layer interposed between the two substrates.

13. The color filter substrate of claim 12, wherein the data signal line includes a plurality of branches and a conductive portion that connects the branches together, the intercolumn non-overlap area being provided so as to face the conductive portion.

14. The color filter substrate of claim 1, wherein the intercolumn non-overlap area is arranged so as to face a storage capacitor line on an active-matrix substrate.

15. The color filter substrate of claim 1, wherein the display device is a liquid crystal display device, and wherein the color filter substrate has a protrusion for controlling orientations of liquid crystal molecules in an area associated with each said pixel.

16. A display device comprising:

the color filter substrate of claim 1;

an active-matrix substrate, which is provided so as to face the color filter substrate; and a display medium layer, which is interposed between the color filter substrate and the active-matrix substrate.

17. The display device of claim 16, wherein the display device is a liquid crystal display device, and
wherein the active-matrix substrate includes a pixel electrode, which has a slit.

18. The display device of claim 17, wherein an electrically connecting portion, associated with a shorter side that intersects with a direction in which the slit extends, is arranged so as to overlap with the light shielding layer or a storage capacitor line on the active-matrix substrate.

19. The color filter substrate of claim 1, wherein the display device is a transmissive display device.

20. The color filter substrate of claim 1, wherein the light shielding column, the first color filter layer, and the second color filter layer together define a multilayer structure in which portions of the light shielding column, the first color filter layer, and the second color filter layer are arranged to overlap corresponding portions of others of the light shielding column, the first color filter layer, and the second color filter layer.

21. The color filter substrate of claim 20, wherein a total height of the multilayer structure is reduced at the intercolumn non-overlap area compared to a total height of other portions of the multilayer structure.

22. A color filter substrate for use in a display device comprising:
a plurality of pixels arranged in columns and rows to define a matrix pattern;
a transparent substrate; and
a number of layers, including a first layer, a second layer, and a third layer, portions of the first layer, the second layer, and the third layer defining a multilayer light shielding structure, each of the first layer, the second layer, and the third layer are provided on the transparent substrate; wherein
each of the first layer and the second layer includes a first column and a second column, and each of the first column and the second column corresponds to a column of pixels; and
the multilayer light shielding structure includes a light shielding column that is disposed in a gap between two adjacent columns of pixels along substantially the entire length of the columns of pixels;
in a gap between two adjacent pixels in a row direction, the light shielding column is arranged to define:
an intercolumn overlap area in which the portions of the first layer, the second layer, and the third layer all overlap with each other; and
an intercolumn non-overlap area in which at least one of the first layer, the second layer, and the third layer is removed such that a total height of the intercolumn non-overlap area is less than a total height of the intercolumn overlap area; and
the intercolumn non-overlap area extends continuously in the row direction such that in plan view the intercolumn non-overlap area completely overlaps the gap between the two adjacent pixels.

23. The color filter substrate of claim 22, wherein at least two of the first layer, the second layer, and the third layer are color filter layers.

24. The color filter substrate of claim 22, wherein at least one of the first layer, the second layer, and the third layer is made from a photosensitive resin.

* * * * *